US010616030B2

(12) United States Patent
Hassan et al.

(10) Patent No.: US 10,616,030 B2
(45) Date of Patent: Apr. 7, 2020

(54) SIGNAL DESIGN FOR DIVERSE DATA RATES

(71) Applicant: Microsoft Technology Licensing, LLC, Redmond, WA (US)

(72) Inventors: Amer Hassan, Kirkland, WA (US); Edward Giaimo, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/600,710

(22) Filed: May 20, 2017

(65) Prior Publication Data
US 2018/0337814 A1    Nov. 22, 2018

(51) Int. Cl.
*H04L 27/34* (2006.01)
*H04L 27/38* (2006.01)
(Continued)

(52) U.S. Cl.
CPC ...... *H04L 27/3416* (2013.01); *H04L 27/0008* (2013.01); *H04L 27/3405* (2013.01);
(Continued)

(58) Field of Classification Search
CPC ............. H04L 27/3416; H04L 27/3461; H04L 27/3854; H04L 1/006; H04L 27/18
(Continued)

(56) References Cited

U.S. PATENT DOCUMENTS 5,822,371 A    10/1998 Goldstein et al.

6,728,467 B2 *    4/2004 Oshima .............. H03M 13/256
348/555
(Continued)

FOREIGN PATENT DOCUMENTS

WO        2012080108 A1    6/2012
WO        2016024848 A1    2/2016
(Continued)

OTHER PUBLICATIONS

Poole, Ian, "5G Mobile Wireless Technology", http://www.radio-electronics.com/info/cellulartelecomms/5g-mobile-cellular/technology-basics.php, Published on: Aug. 18, 2012, 10 pages.
(Continued)

*Primary Examiner* — Chieh M Fan
*Assistant Examiner* — Fitwi Y Hailegiorgis
(74) *Attorney, Agent, or Firm* — NovoTechIP International PLLC

(57) ABSTRACT

Systems for utilizing bandwidth of a wireless network in an efficient manner are disclosed. Bandwidth may be allocated between different types of devices by dividing a symbol constellation into subsets of points, where each of the subsets may be used for transmitting data from a different device to a base station on single frequency channel. The symbol constellation may be shared on the frequency channel by dynamic or static allocation of the subsets of points to different devices. A first device with high data speed requirements may be allocated a first subset of points of the symbol constellation fix transmitting data to the receiver, while a second device with lower data speed requirements may be allocated a second smaller subset of the symbol constellation for transmitting data to a receiver. The first and second devices may then transmit data to the receiver on the frequency channel.

20 Claims, 11 Drawing Sheets

(51) Int. Cl.
*H04L 27/00* (2006.01)
*H04L 1/00* (2006.01)
*H04L 27/18* (2006.01)

(52) U.S. Cl.
CPC ...... *H04L 27/3461* (2013.01); *H04L 27/3472* (2013.01); *H04L 27/3488* (2013.01); *H04L 27/3854* (2013.01); *H04L 1/006* (2013.01); *H04L 27/18* (2013.01)

(58) Field of Classification Search
USPC ............... 375/265; 455/9; 348/555; 370/328
See application file for complete search history.

(56) References Cited

U.S. PATENT DOCUMENTS

| | | | |
|---|---|---|---|
| 7,394,865 | B2 | 7/2008 | Borran et al. |
| 8,005,114 | B2 | 8/2011 | Mishra et al. |
| 8,068,547 | B2 | 11/2011 | Schenk |
| 8,923,186 | B1 | 12/2014 | daCosta |
| 9,231,705 | B1 * | 1/2016 | Caton ................ H04B 10/5161 |
| 9,419,838 | B1 | 8/2016 | Wentzloff et al. |
| 9,461,858 | B1 | 10/2016 | Zhang et al. |
| 10,200,982 | B2 * | 2/2019 | Xue ....................... H04J 11/005 |
| 2001/0006509 | A1 | 7/2001 | Nguyen et al. |
| 2008/0292017 | A1 | 11/2008 | Wetzker et al. |
| 2010/0203826 | A1 * | 8/2010 | Xue ................... H04B 7/15521 455/9 |
| 2013/0010839 | A1 | 1/2013 | Tsouri et al. |
| 2016/0014619 | A1 * | 1/2016 | Kang .................... H04W 24/02 370/328 |
| 2018/0013477 | A1 * | 1/2018 | Kim ........................ H04B 7/04 |

FOREIGN PATENT DOCUMENTS

| | | |
|---|---|---|
| WO | 2016089129 A1 | 6/2016 |
| WO | 2016116461 A1 | 7/2016 |
| WO | 2016174508 A1 | 11/2016 |

OTHER PUBLICATIONS

"International Search Report and Written Opinion Issued in PCT Application No. PCT/US2018/028976", dated Jul. 19, 2018, 14 Pages.

Tsouri, et al., "Wireless Channel Access Through Jointly Formed Signal Constellations", In IEEE 17th International Symposium on Personal, Indoor and Mobile Radio Communications, Sep. 2006, 5 Pages.

Geier, Eric, "How MU-MIMO Wi-Fi works to improve the speed and capacity of home networks", http://webcache.googleusercontent.com/search?q=cache:oz_xMD1wYUQJ:www.techhive.com/article/2928725/how-mu-mimo-wi-fi-works.html+&cd=2&hl=en&ct=clnk&gl=in, Published on: Jun. 1, 2015, 3 pages.

* cited by examiner

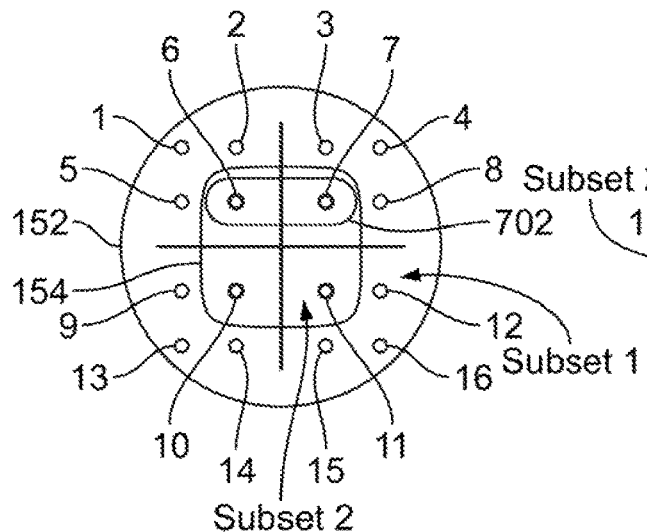 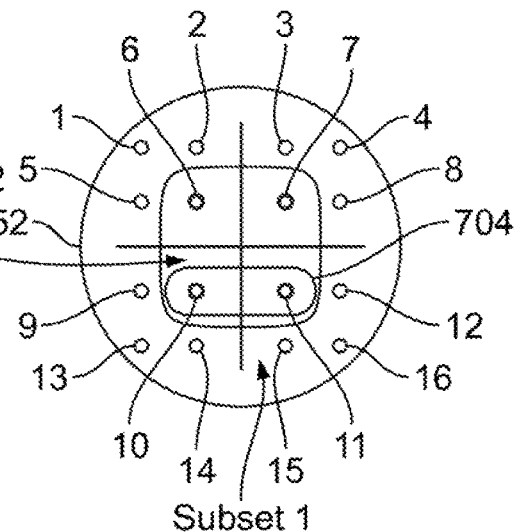
FIG. 7A       FIG. 7B
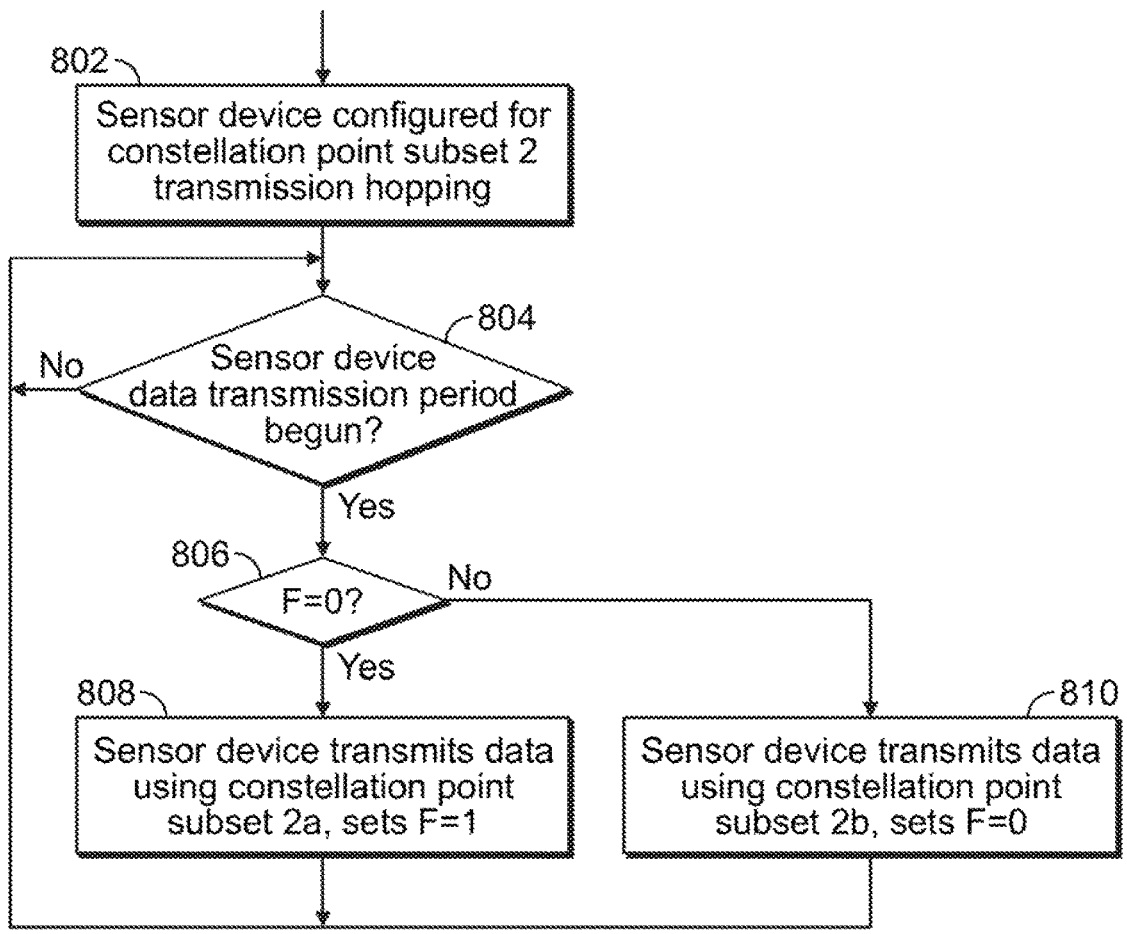
FIG. 8

SIGNAL DESIGN FOR DIVERSE DATA RATES

BACKGROUND

Over the last several decades there has been a continuous development of wireless communications technology and an accompanying increase in the variety and sophistication of wireless network applications that are available to users. This has resulted in increasingly stringent and demanding requirements on the data transmission capabilities that a network and/or device may need to provide. For example, Internet of Things (IoT) sensor devices have been developed and configured to use cellular network channels to send collected data to a destination database. These IoT sensor devices, which may include devices such as traffic data sensors, weather data sensors, health data sensors, utility meter sensors, business related sensor devices, or sensor devices in other appropriate applications, are expected to be widely dispersed. This will create even higher demand for radio channel bandwidth resources in cellular systems.

When sending collected data, each of these IoT sensor devices will utilize a channel of a network for the sending of the data. The utilized channel will be removed from other possible uses by the network and will not be available as a bandwidth resource for other network devices when an IoT sensor device is sending data. Also, the IoT sensor devices and the network may need to negotiate channel assignments/ allocations for the IoT sensor devices each time an IoT sensor device needs to send data to the network. In this case, the IoT sensor devices need to be designed with full capabilities for this negotiation and design/deployment of the IoT sensor devices may be more complicated and expensive than desired. Also, the negotiation will require use of additional time, computing, and bandwidth resources in the IoT sensor devices and in the network.

SUMMARY

This summary is provided to introduce a selection of concepts in a simplified form that are further described below in the Detailed Description. This summary is not intended to exclusively or exhaustively identify key features or essential features of the claimed subject matter. Nor is it intended as an aid in determining the scope of the claimed subject matter.

The embodiments of the disclosure provide systems, methods, and apparatus for utilizing bandwidth of a network by using symbol constellation point sharing on a frequency channel. In the embodiments, bandwidth may be allocated by dividing a symbol constellation of a channel into subsets of constellation points, where each of the subsets of constellation points may be used for transmitting data from a different device to a receiver, or transmitting different types of data to the receiver. A symbol constellation for a signal on a frequency channel may be shared between different types of data by dynamic or static allocation of subsets of points of the symbol constellation to different devices. For example, a first device with high data speed requirements may be allocated a first subset of a selected number of points of the symbol constellation points for transmitting data to the receiver, and a second device with lower data speed requirements may be allocated a second subset of the symbol constellation points for transmitting data to a receiver, where the second subset has less points than the selected number of points in the first subset. Both the first device and second device may transmit data to the receiver on the same frequency channel using their allocated symbol constellation points while effectively sharing the bandwidth resources of the frequency channel.

An implementation may comprise an apparatus including a receiver configured to operate in a first mode to receive a first signal modulated in a first subset of points of a symbol constellation from a first device, receive a second signal modulated in a second subset of the symbol constellation from a second device, demodulate the first signal to generate a first set of data, and demodulate the second signal to generate a second set of data. The receiver may then process the first set a data and the second set of data appropriately. For example, the receiver may send each of the first set of data and the second set of data onward through a network to different destination devices. The allocation of subsets of the symbol constellation points for use by the first and second devices may be done on a dynamic basis. When the second device does not need to transmit data to the apparatus, the receiver of the apparatus may operate in a second mode to receive a third signal modulated in both the first and the second subsets of the symbol constellation from the first device, and, demodulate the third signal to generate a third set of data. The receiver may then process the third set of data appropriately. For example, the receiver may send the third set of data onward through the network to a destination device for data sent from the first device. The receiver may switch between the first mode and second mode for receiving data depending on the needs of the second device to send data. The apparatus may include a transmitter that allows the apparatus to transmit appropriate control information associated with symbol constellation point subset allocations to the first and second device. In an example implementation, the apparatus may be implemented in a base station of a cellular network.

Another implementation may comprise an apparatus including a transmitter configured to determine a first subset of points of a symbol constellation, process and modulate a data stream in the first subset of points to generate a first signal, and transmit the first signal to a receiver on a frequency channel. In a further example implementation, the apparatus may determine that a second subset of points of the symbol constellation is available for use by the apparatus, modulate the data stream in both the first and the second subsets of points to generate a second signal, and transmit the second signal to the receiver on the frequency channel. The determinations of the first and second subsets of points of the symbol constellation, and whether to use the first subset of points and/or second subset of points for transmitting may be dynamic and based on control information associated with a receiver receiving the signal from the apparatus. The determinations of the first and second subsets of points may also be based on a predetermined assignment/ time period allocation stored in a memory. In an example, the apparatus may be implemented in a mobile device in a cellular network. The mobile device may be allocated the first and second subsets of points dynamically to maintain data transmission at as high a rate as possible while sharing the second subset of points with other transmitting devices. In another example, the apparatus may comprise a sensor device that is allocated the second subset of points for low data rate transmission of collected data to a receiver as needed. In a further example, the sensor device may also transmit using a constellation point subset "hopping scheme" by alternately transmitting collected data on different subgroups of two or more points of the second subset of points to avoid interference with other sensor devices or mobile devices that are sending transmission to a receiver on the same frequency channel.

A further implementation comprises a network that includes a base station configured to receive one or more signals modulated using one or more points of a symbol constellation by operating in a first mode and a second mode. In the first mode the base station may receive and demodulate a first signal modulated in each of the points of the symbol constellation from a mobile device on a frequency channel. In the second mode the base station may receive and demodulate a second signal modulated in a first subset of the points of the symbol constellation from the mobile device and a third signal modulated using a second subset of the points of the symbol constellation from a sensor device on the same frequency channel. The mobile device may be configured to modulate a data stream into the first signal using each of the points of the symbol constellation and transmit the first signal to the base station on the frequency channel. The mobile device may also be configured to modulate the data stream into the second signal using the first subset of the points of the symbol constellation and transmit the second signal to the base station on the frequency channel. The sensor device may be configured to modulate collected data into the third signal using the second subset of points of the symbol constellation and transmit the third signal to the base station on the frequency channel. The base station may transmit control information to the mobile device defining time periods within which the mobile device may transmit the first signal using each of the points of the symbol constellation, and/or time periods within which the mobile device may transmit the second signal using only the first subset of points of the symbol constellation. The sensor device may be configured to transmit collected data to the base station in the third signal during the time periods in which the mobile device is using only the first subset of points of the symbol constellation.

BRIEF DESCRIPTION OF THE DRAWINGS

FIGS. 7A and 7B are diagrams illustrating further example symbol constellation point subset allocations;

FIG. 8 is a flow diagram of example operations performed by a sensor device for transmitting signals modulated in subsets of points of a symbol constellation;

DETAILED DESCRIPTION

Figure 1A:
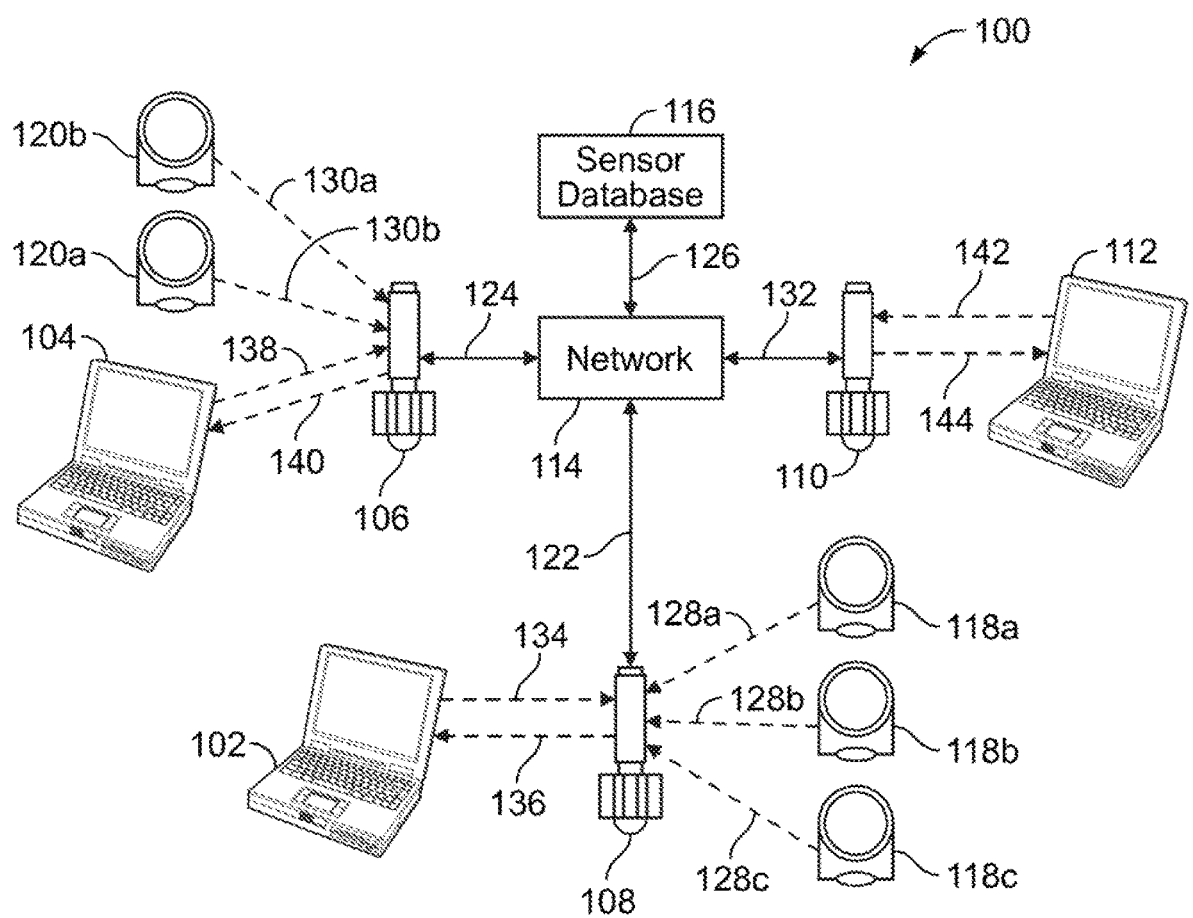
FIG. 1A is a diagram illustrating a system including example devices operable according to embodiments of the disclosure.

The system, method and apparatus will now be described by use of example embodiments. The example embodiments are presented in this disclosure for illustrative purposes, and not intended to be restrictive or limiting on the scope of the disclosure or the claims presented herein.

The disclosed embodiments provide systems, methods, and apparatus for transmitting data by dividing a symbol constellation used on a frequency channel into subsets of points, where each subset of points may carry modulated data from a different device. The subsets of points may be created and used statically or dynamically, depending on network conditions and requirements. For example, a symbol constellation may be shared between transmitting devices that have different data rate requirements. A subset of points comprising N points of the symbol constellation may be used as a "fast data lime" for a first transmitting device on the frequency channel, and a subset of points comprising M points, where M<N, of the symbol constellation may be used as a "slow data lane" for a second transmitting device on the frequency channel.

The embodiments of the disclosure have application to improve network transmission efficiency. For example, an implementation may be utilized for sending data from data collecting sensor devices, such as Internet of Things (IoT) sensor devices that transmit data infrequently and transmit the data at low data speeds through a cellular system, IoT devices typically communicate using low data rates at extended/long ranges while cellular networks are required to enable user devices and applications that typically provide high data rates at both short and long ranges. The embodiments may provide advantages in cellular networks in that diverse device types, for example, IoT sensor devices and user devices, may be supported in diverse use cases that include sensor data gathering, high speed video streaming, or real-time asynchronous communication, etc. A diversity of applications may be supported by the spectrum and power efficient techniques of the embodiments.

An IoT sensor device and a mobile device that are both transmitting data to a base station of a cellular system may share a symbol constellation on a frequency channel through constellation point subset allocation. An IoT sensor device may be reserved as slow data lane that comprises a first subset of two or more points of a symbol constellation. A mobile device that requires higher data rates than the IoT sensor device requires may be reserved a fast data lane that comprises a second subset of points comprising the remaining points of the symbol constellation. The second subset of points may be larger in number than the first subset of points, where the number in each subset may be determined based on the data rate requirements of the devices. The IoT sensor devices may access and transmit using the slow data lane on an assigned time period basis or by random access while a mobile device transmits on the fast lane. When no IoT sensor devices need the slow lane for data transmission, the mobile device aviary transmit data to the system using both the slow data lane and the fast data lane constellation points.

Use of the embodiments allows a system to be dynamically and flexibly configured to support data collecting sensor devices that may use the system in a less intensive, intermittent, and/or random way as compared to conventional mobile devices using the system. Rather than a frequency channel being removed from other possible uses by the network when a sensor device needs to transmit sensor data to the net the bandwidth resources of the symbol constellation and frequency channel are shared between the sensor device and a mobile device. The sensor devices do not need to use network resources to negotiate channel assignments/allocations each time the sensor device needs to send data to the network. This allows the sensor devices to be of simpler design. For example, in an implementation in which no scheduling/negotiations for obtaining network access are needed to be performed by the sensor devices, the sensor devices may be is as simple transmitter devices without any receivers. In one implementation, the sensor devices may be configured as simple transmitters to transmit data using random access and transmission repetition so that the effects of collisions with other data collecting devices are minimized. In this scenario, a base station may be constantly monitoring/decoding the slow lane data to detect that sensor device transmissions are present on the frequency channel so the base station may configure itself when needed to receive transmissions from both a sensor device and a mobile device.

In another implementation in which the slow data lane is assigned on a dynamic basis to sensor devices during selected time periods, the sensor devices may also be configured to transmit data using random access and transmission repetition within those selected time periods to avoid collisions between other sensor devices that transmit at the same time on the same frequency channel. In this scenario, a base station may monitor/decode the slow lane during those selected time periods to detect and receive data from data collecting sensor devices. The selected time periods during which the slow lane may be used by the sensor devices may be determined based on a time schedule. Base stations, mobile devices, and sensor devices may share symbol constellation point subsets according to the time schedule. In one example, machine learning/network monitoring techniques may be utilized to monitor data collecting sensor device transmissions in order to determine optimal selected time periods during which the slow lane may be assigned only to sensor devices, and the time periods within which higher speed mobile devices may use both the fast and slow lanes.

FIG. 1A is a diagram illustrating a system 100 including example devices configured according to embodiments of the disclosure. FIG. 1A shows system 100 including mobile device 102, mobile device 104, base station 106, base station 108, base station 110, mobile device 112, network 114, sensor devices 120a and 120b, sensor devices 118a, 118b, and 118c, and sensor database 116. While mobile devices 102, 104, and 112 are shown as example laptop computing devices, in other implementations, mobile devices 102, 104, and/or 112 may be configured as any other type of device with wireless capabilities that includes a transmitter and/or receiver that may be configured to communicate with base stations 106, 108, and/or 110 according to the embodiments. Also, mobile devices 102, 104, or 112 may be implemented as stationary wireless devices, such as desktop computers. Additionally, while base stations 106, 108, and 110 are shown as example cellular base stations, base stations 106, 108, and/or 110 may be configured as any other type of terminal, access point (AP), or any other device/apparatus that communicates with another wireless device. In various examples, system 100 may be implemented as a UMTS/WCDMA cellular system, a 5G cellular network, a Wi-Fi network, or a local access network (LAN). Network 114 may comprise a network that connects base stations 1063, 108, and 110 through the internet to the cloud. In various implementations, network 114 may also comprise any other type of network infrastructure, core network, and/or network switching elements that may be configured to allow base stations 106, 108, and 110 to communicate with one another or with other networks/systems.

During, operation of system 100, mobile device 102 transmits uplink signal transmissions 134 to base station 108 and receives downlink signal transmissions 136 from base station 108. Similarly, mobile device 104 transmits uplink signal transmissions 138 to base station 106 and receives downlink signal transmissions 140 from base station 106, and mobile device 112 transmits uplink signal transmissions 142 to base station 110 and receives downlink signal transmissions 144 from base station 110. Base stations 106, 108, and 110 send/receive signals on network links 124, 122, and 132 from/to network 114, respectively, as needed, to implement communications between mobile devices 102, 104, and 106 and other devices and/or systems. Sensor devices 120a and 120b may intermittently transmit uplink sensor data transmissions 130a and 130b, respectively, to base station 108 on the same frequency channel used by mobile device 104 for sending uplink signal transmissions 138 to base station 106. Base station 106 may send the data to sensor database 116 using network link 124. Also, sensor devices 118a, 118b, and 118c may intermittently transmit uplink sensor data transmissions 128a, 128b, and 128c, respectively, to base station 108 on the same frequency used by mobile device 102 for sending uplink signal transmissions 134 to base station 108. Base station 108 may send the data to sensor database 116 using network link 122.

In an implementation of system 100, mobile device 102 may be configured to operate in a first mobile (MS) mode or second MS mode for sending transmissions to base station 108. Also, base station 108 may be configured to operate in a first base station (BS) mode or in a second BS mode for receiving the transmissions sent by mobile device 102 operating in the first or second MS mode, respectively. The first MS mode of operation may be used by mobile device 102 and the first BS mode of operation maybe used by base station 108 during time periods in which base station 108 is not receiving sensor data from any of data sensor devices 118a, 118b, or 118c. The second MS mode of operation may be used by mobile device 102 and the second BS mode of operation may be used by base station 108 during time periods in which base station 108 is receiving uplink sensor data transmissions 128a, 128b, or 128c from one or more of data sensor device 118a, 118b, or 118c at the same time, or at substantially the same time, that base station 108 is receiving uplink signal transmissions 134 from mobile device 102. For example, mobile device 102 and base station 108 may operate in the first MS mode of operation and first BS mode of operation, respectively, when none of sensor devices 118a, 118b, car 118c are sending, sensor data to base station 108. When one or more of sensor devices 118a, 118b, or 118c have sensor data to send, or are sending sensor data to base station 108, mobile device 102 and base station 108 may operate in the second MS mode of operation and second BS mode of operation, respectively.

In this disclosure, the implementations of base station 108 operating in the second BS mode may be described by referring to sensor data devices 118a, 118b, and 118c as a group. These descriptions are meant to cover any of the scenarios in which only one, only two, or all three of the sensor data devices 118a, 118b, or 118c, may be sending data to base station 108 during the second BS mode of operation. For example, the system 100 may be configured so that sensor data devices 118a, 118b, and 118c alternate sensor data transmissions on a round robin basis between each of the separate time periods in which the second BS mode is initiated in base station 108. In another alternative, the system 100 may be configured so that sensor data devices 118a, 118b, and 118c alternate sensor data transmissions on a time shared basis within each time period in which base station 108 operates in the second BS mode. In another alternative, sensor data devices 118a, 118b, and 118c may transmit randomly, on a random access basis, with possible overlapping transmissions during the time periods in which base station 108 operates in the second BS mode.

Figure 1B:
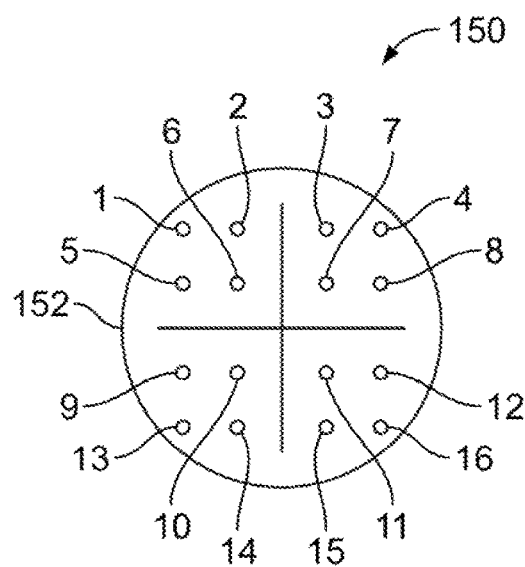
FIGS. 1B and 1C are diagrams illustrating example symbol constellation point allocations.

FIG. 1B shows an example cellular symbol constellation for use in a system during a first mode of operation. FIG. 1B shows a cellular symbol constellation 150 comprising 16 points, points 1-16 within the circular line 152, that may be utilized in network 100 by mobile device 102 when operating in the first MS mode and base station 108 when operating in the first BS mode of operation. Each signal constellation point 1-16 may be considered an abstraction representation of real signals transmitted over the air. Each constellation point 1-16 may represent a separate signal, which in turn represents unique digital symbols (e.g., bits) of transmitted data. Cellular constellation 150 is shown as an example 16-Quadratue Amplitude Modulation (QAM) constellation. In the first MS mode of operation, uplink single transmissions sent from mobile device 102 are modulated by sending uplink signal transmissions 134 on a frequency channel using 16-QAM and all 16 points, points 1-16, of cellular constellation 150.

Figure 1C:
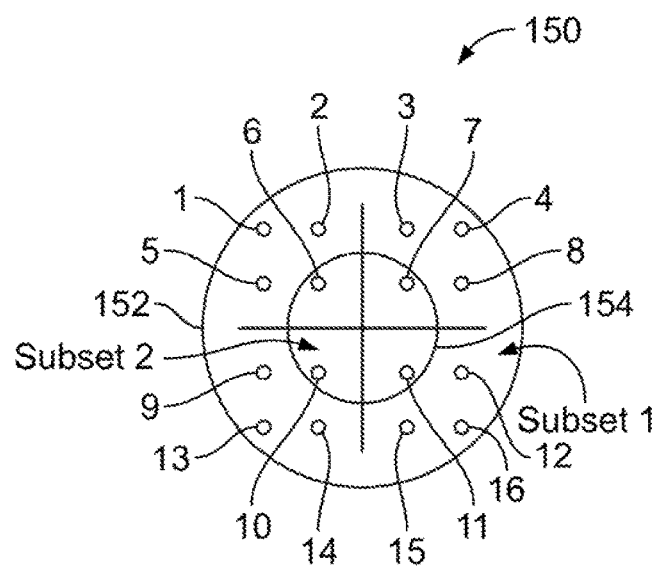

FIG. 1C shows the cellular symbol constellation 150 of FIG. 1B divided into example subsets of the cellular symbol constellation 150 for use by mobile device 102 when operating in the second MS mode of operation. In FIG. 1C, symbol constellation 150 is divided into constellation point subset 1 and constellation point subset 2, where constellation point subset 1 and constellation point subset 2 are each subsets of points of constellation 150. Constellation point subset 1 includes constellation points 1, 2, 3, 4, 5, 8, 9, 12, 13, 14, 15, and 16 is located between circular lines 152 and 154, and, constellation point subset 2 includes constellation points 6, 7, 10 and 11 that are located within circular line 154. Constellation point subset 1 may be utilized in network 100 by mobile device 102 for modulating uplink signal transmissions 134 sent to base station 108 when mobile device 102 and receiving base station 108 are operating in the second MS mode and second BS mode, respectively. When operating in the second MS mode of operation, mobile device 102 modulates uplink signal transmissions 134 on the same frequency channel as used in first MS mode by using the 12 constellation points in constellation point subset 1. In one example of mobile device 102 operating in the second MS mode, mobile device 102 may use a selected group of 8 of the 12 constellation points in subset 1, and map sets of 3 bits to each of the selected 8 points to modulate uplink signal transmission 134. In another example of using the 12 constellation points, mobile device 102 may use redundancy trellis code modulation techniques to vary the bits of the selected group of 8 points to which sets of 3 bits are mapped to provide redundancy for the data modulated in uplink signal transmission 134.

When base station 108 is operating in the second BS mode using consultation point subset 1 to receive uplink signal transmissions 134 sent by a mobile device 102, base station 108 may also receive sensor data transmissions 128a, 128b, and/or 128c sent from one or more of data sensor device 118a, 118b, and/or 118c, respectively, to base station 108 using constellation point subset 2, Sensor devices 118a, 118b, and/or 118c, may transmit the sensor data transmissions 128a, 128b, and/or 128c on the same frequency channel as used by mobile device 102 to transmit uplink signal transmissions 134 to base station 108. For example, data sensor device 118a, 118b, or 118c may modulate sensor data using quadrature phase shift keying (QPSK) and the four points of constellation point subset 2. In another example, constellation point subset 2 may contain 2 points and data sensor device 118a, 118b, and/or 118c may modulate sensor data using binary phase shift keying (QPSK).

In other implementations of FIGS. 1 and 1C, the symbol constellation 150 may be configured to be of any other size. For example, symbol constellation 150 may be implemented as 32, 64, or 128 point constellation. Depending on the size of the symbol constellation used, when mobile device 102 transmits uplink signal transmissions 134 using the whole constellation in the first MS mode, 32-QAM, 64-QAM, or 128-QAM may be used for modulation/demodulation. When mobile device 102 and base station 108 operate in the second MS mode and second BS mode, respectively, constellation point subsets of the symbol constellation may then be allocated to mobile device 102, sensor device 118a, and base station 108 for use in transmitting or receiving transmissions according to the size of the constellation. Also, in one alternative, when operating in the first MS mode and first BS mode, respectively, mobile device 102 and base station 108 may continue to use the selected group of constellation points in subset 1 that is used in the second MS mode and the second BS mode rather than changing to use the whole set of constellation points in the symbol constellation. For example, when using the 16 point constellation of FIGS. 1B and 1C, a selected group of 8 of the 12 constellation points in subset 1 may be used by mobile device 102 for modulation while operating in the first MS mode instead of mobile device 102 switching to use the whole set of 16 constellation points in symbol constellation 150. In this alternative, mobile device 102 may continue to use a selected group of 8 of the 12 constellation points in subset 1, when operating in the first MS mode as it does when operating in the second MS mode, and map sets of 3 bits to each of the selected 8 points to modulate uplink signal transmission 134. In this case, the four points of constellation point subset 2 will go unused by mobile device 102. In a variation of this alternative, mobile device 102 may use redundancy trellis code modulation techniques to vary the bits of the selected group of 8 points that is selected from the 12 constellation points in subset 1. Sets of 3 bits of data to be transmitted may then be mapped to the selected group of 8 points, providing redundancy for the data sent in uplink signal transmission 134.

Figure 2A:
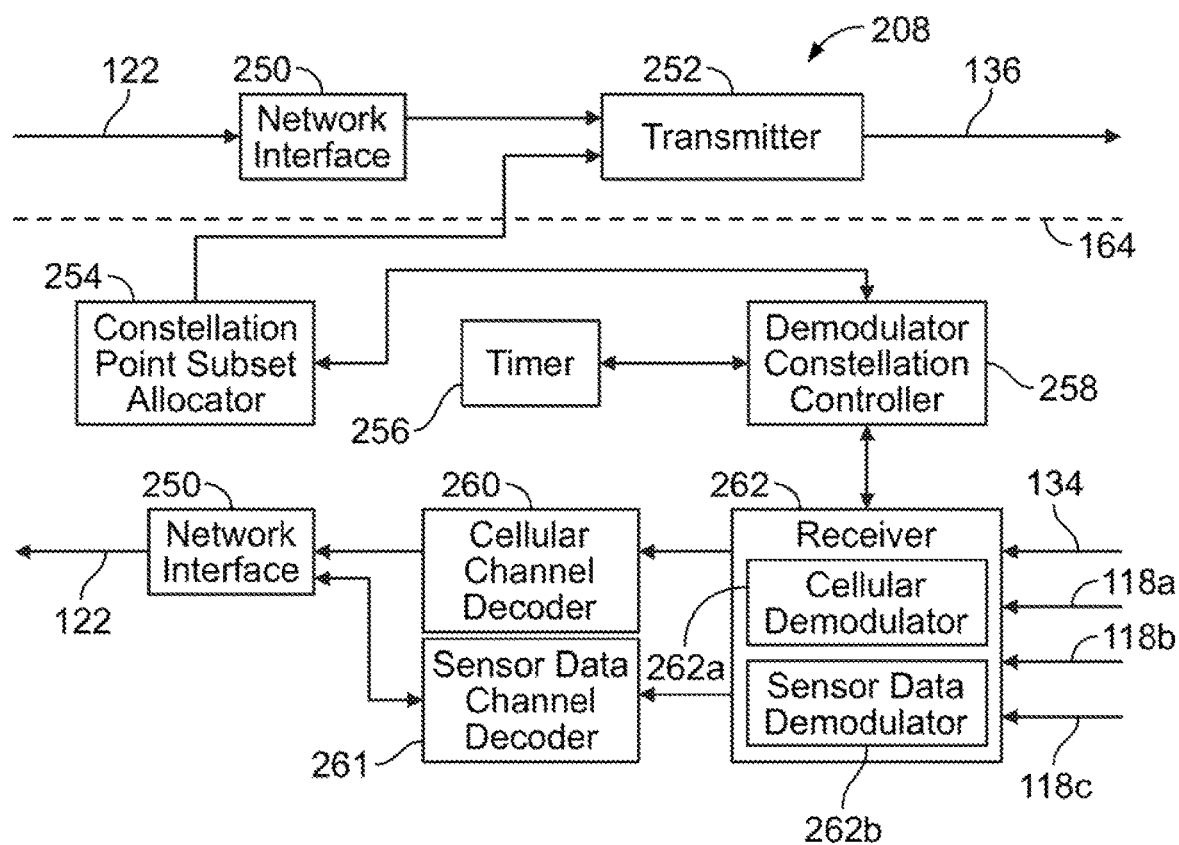
FIG. 2A is a simplified diagram illustrating a base station including an example receiver.

FIG. 2A is a simplified diagram illustrating a base station 208 including an example receiver. In an example implementation of FIG. 2A, base station 208 of FIG. 2A may represent base station 108 of FIG. 1A or base stations 106 and 110 of FIG. 1A. Base station 208 may include network interface 250, transmitter 252, constellation point subset allocator 254, timer 256, demodulator constellation controller 258, cellular channel decoder 260, sensor data channel decoder 261, and receiver 262. Receiver 262 may include cellular demodulator 262a and sensor data demodulator 262b. In one implementation, cellular demodulator 262a and sensor data modulator 262b may represent a joint baseband demodulator that processes signals from both mobile device 102 and sensor device 118a. Functionally, the joint baseband demodulator includes the functions of cellular demodulator 262a, that processes the received cellular signal for a higher order modulation scheme, and sensor data modulator 262b, that processes the received sensor data signal for a lower order modulation scheme.

In one implementation, when operating in the first BS mode of operation, base station 208 may receive signals from mobile device 102 that are modulated using the subsets of points of constellation 150 of FIG. 1C that comprise constellation point subset 1 and constellation point subset 2. In this mode, demodulator constellation controller 258 uses the control information to control cellular demodulator 262a to demodulate signals received from mobile device 102 based on both constellation point subsets 1 and 2. In an alternative implementation, when operating in the first BS mode of operation, base station 208 may receive signals from mobile device 102 that are modulated using the subset of points of constellation 150 that comprises constellation point subset 1. Base station 208 may operate in the first BS mode when sensor data transmissions are not being sent from sensor devices 118a, 118b, or 118c and there is no need for base station 208 to receive sensor data transmissions 128a, 128b, or 128c.

In the second BS mode of operation, base station 208 may receive uplink signal transmissions 134 from mobile device 102, and sensor data transmissions 128a, 128b, and/or 128c from sensor devices 118a, 118b, and/or 118c, respectively, on the same frequency channel. The transmissions from mobile device 102 may be separable at base station 208 from the transmissions from the sensor devices 118a, 118b, and/or 118c by demodulation at base station 208 using constellation point subset 1 for signal transmissions received from mobile device 102, and, demodulation at base station 208 using constellation point subset 2 for sensor data transmissions received from one or more of sensor devices 118a, 118b, and/or 118c at base station 208. Separate demodulation processes may be performed at base station 208 to demodulate and separate the signal transmissions from mobile device 102 and sensor devices 118a, 118b and/or 118c.

The demodulation operations performed at receiver 262 of base station 208 in the second BS mode may differ depending on the implementation of system 100 as to how mobile device 102 and sensor device 114a, 118b, and 118c coordinate data transmissions with one another. For example, the system 100 may include scenarios when only mobile device 102 or only one or more of sensor devices 118a, 118b, and 118c is transmitting to base station 208 on a cellular frequency channel when base station 208 is in the second BS mode. In these implementations, mobile device 102 and sensor devices 118a, 118b, and 118c are coordinated and do not transmit at the same tune on the same frequency to base station 208. That is, mobile device 102 transmits to base station 208 at different times than do any of the sensor devices 118a, 118b, and 118c. In this case, demodulation of the signal is performed with either cellular demodulator 262a estimating the bits sent from mobile device 102, or sensor data demodulator 262b estimating, the bits sent from one or more of sensor data devices 118a, 118b, and/or 118e, depending on which type of device is sending the data.

The system 100 may also include scenarios when mobile device 102 and one or more of sensor device 118a, 118b, or 118c are transmitting simultaneously to base station 208 on the cellular frequency channel when base station 208 is in the second BS mode. In this case, cellular demodulator 262a in base station 208 will treat the signal received from the sensor devices 118, 118b, and/or 118c during the period base station 208 operates in the second BS mode as a weak interference to the signal received from mobile device 102. Cellular demodulator 262a may estimate the signal sent from mobile device 102 based on treating the signal received from the sensor devices 118a, 118b, and/or 118c as weak interference. Also, in this scenario, sensor data demodulator 262b may demodulate the signals received from the sensor devices 118a, 118b, and/or 118c by treating the signal from mobile device 102 as strong interference. In this case, sensor data demodulator 262b may subtract the strong interference associated with the signal from mobile device 102 while demodulating the signals from the sensor devices 118a, 118b, and/or 118c. In an alternative implementation, receiver 262 may be configured to demodulate the joint signals from mobile device 102 and sensor devices 118a, 118b, and/or 118c using a 2-user multiple access scheme.

Cellular demodulator 262a may demodulate the uplink signal transmissions 134 received from mobile device 102 under the control of demodulator constellation controller 258 and generate a data stream including a set of binary data. Channel decoder 260 may then be used to decode the data stream to remove the channel coding, and the data stream may then be sent onward to its one or more destinations through network interface 250 on network link 122. Sensor data demodulator 262b may demodulate the sensor data transmissions 128a, 128b, and/or 128c received from sensor device 118a, 118b, and/or 118c under the control of demodulator constellation controller 258 using constellation point subset 1 of the cellular symbol constellation and generate a sensor data stream including a set of binary data. Sensor data channel decoder 261 may then be used to decode the sensor data to remove the channel coding, and the sensor data stream may then be sent onward to sensor database 116 from interface 250 on network link 122. Timer 256 and constellation point subset allocator 254 may provide control information to demodulator constellation controller 258. Demodulator constellation controller 258 uses the control information to control cellular demodulator 262a and sensor data demodulator 262b to demodulate signals received from mobile device 102 and from sensor devices 118, 118b, and 118c, respectively, based on the allocation of the subsets of constellation points to mobile device 102 and sensor devices 118, 118b, and 118c for transmitting to base station 208. While operating in the second BS mode, base station 208 may receive transmissions from multiple devices, such as mobile device 102 and one or more of sensor devices 118, 118b, and 118c, simultaneously.

Also, transmitter 252 may receive data on network link 122 through network interface 250 and transmit the data in downlink signal transmissions 136 to mobile device 102. Transmitter 252 may also receive control information from constellation point subset allocator 254 and transmit the control information in downlink signal transmissions 136 to mobile device 102 to inform mobile device 102 on hon it should transmit data. For example, if base station 208 is operating in the first BS mode, the control information may instruct mobile device 102 to use all the cellular symbol constellation points when transmitting to base station 208. If base station 208 is operating in the second BS mode the control information may instruct mobile device 102 on which constellation point subsets of the symbol constellation 150 to use when transmitting to base station 208.

Figure 2B:
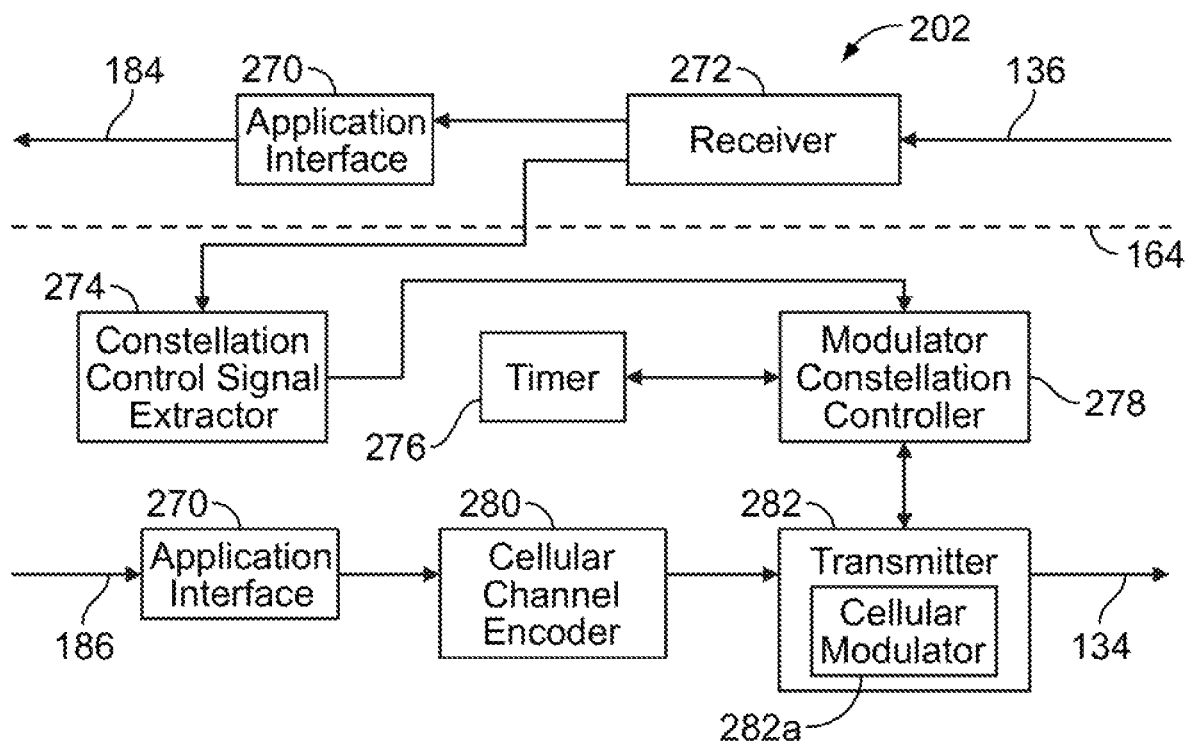
FIG. 2B is a simplified diagram illustrating a device including an example transmitter.

FIG. 2B is a simplified diagram illustrating a device 202 including an example receiver. In an example implementation of FIG. 2B device 202 of FIG. 2B may represent mobile device 102, device 104 and/or device 112 of FIG. 1A mobile device 102. Device 202 may include application interface 270, receiver 272, constellation control signal extractor 274, timer 276 modulator constellation controller 278, cellular channel encoder 280, and transmitter 282. Transmitter 282 may include cellular modulator 282a. In operation of device 202, device 202 may send uplink signal transmissions 134 to base station 108. Channel encoder 280 may receive a data stream including a set of binary data from application 270, and cellular channel encoder 280 may encode the data stream and provide the encoded data stream to cellular modulator 282a.

In a first MS mode of operation, corresponding to the first BS mode of base station 108, cellular modulator 282a modulates the data stream under the control of modulator constellation controller 278 and generates an uplink signal transmission 134 that is transmitted to base station 108. In one implementation, when operating in the first MS mode, device 202 may modulate data to be transmitted using the subsets of points of constellation 150 that comprise both constellation point subset 1 and constellation point subset 2. In an alternative implementation, when operating in the first MS mode, device 202 may modulate data to be transmitted using only the subset of points of constellation 150 that comprises constellation point subset 1.

In a second MS mode of operation, corresponding to the second BS mode of operation of base station 108, cellular modulator 262a modulates the data stream under the control of modulator constellation controller 278 using the subset of points of constellation 150 that comprises constellation point subset 1 and generates an uplink signal transmission 134 that is transmitted to base station 108 by transmitter 282. Timer 276 and constellation control signal extractor 274 may provide control information to modulator constellation controller 278. Modulator constellation controller 278 uses the control information to control cellular modulator 282a to modulate the data stream to be transmitted based the subsets of constellation points allocated to device 202.

Receiver 272 may receive downlink signal transmissions 136 transmitted by base station 108. The signals received by receiver 272 may be provided to application interface 270. Receiver 272 may also provide received downlink signal transmissions 136 to constellation control signal extractor 274. Constellation control signal extractor 274 max then extract control information sent to device 202. Constellation control signal extractor 274 may then provide the extracted control information to modulator constellation controller 278. Modulator constellation controller 278 limy use the control information to instruct cellular modulator 282a on what cellular symbol constellation points or subsets of symbol constellation points to use when transmitting to base station 108, depending on the mode of operation to be used by device 202 and base station 108.

Figure 2C:
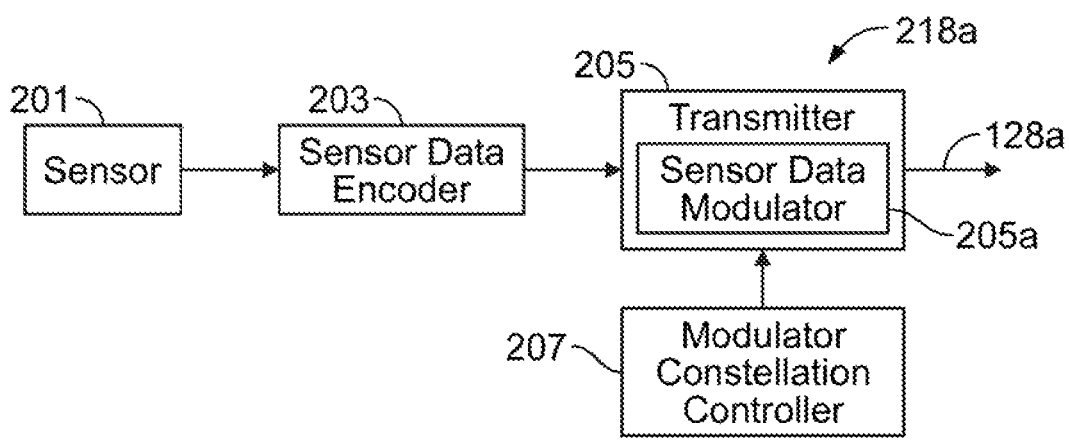
FIG. 2C is a simplified diagram illustrating a device including another example transmitter.

FIG. 2C is a simplified diagram illustrating a sensor device 218a including an example transmitter. In an example implementation of FIG. 2C, sensor device 218a of FIG. 2C may represent sensor devices 118a, 118b, 118c, 120a, and 120b of FIG. 1A. Sensor device 218a may include sensor 201, sensor data encoder 203, modulator constellation controller 207, and transmitter 205. Transmitter 205 may include sensor data modulator 205a. In operation of sensor device 218a, sensor 201 collects data and provides the collected data to sensor data encoder 203. Sensor data encoder 203 encodes the data with appropriate channel encoding and provides the encoded data to transmitter 205. Sensor data modulator 205a of transmitter 205 modulates the encoded sensor data using constellation point subset 2 of the cellular symbol constellation. Transmitter 205 then transmits the modulated signal to base station 108 as sensor data transmission 128a.

Figure 3A:
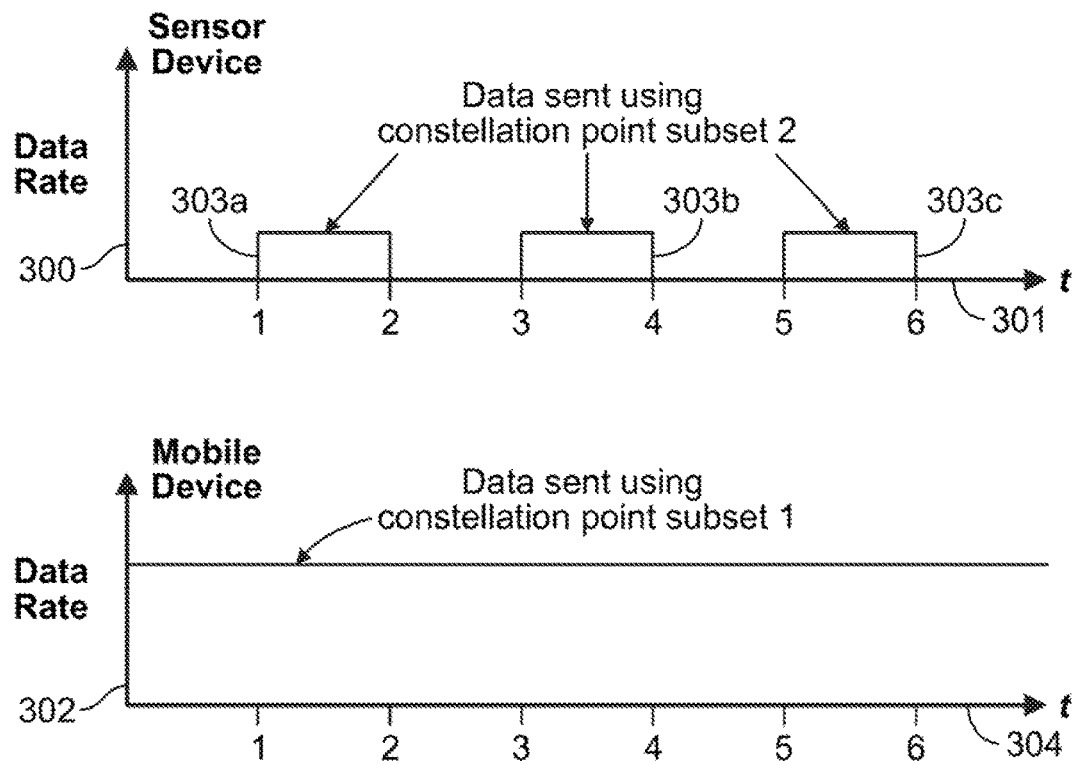
FIGS. 3A and 3B are diagrams illustrating example device data rates versus time when allocating symbol constellation point subsets according to FIGS. 1B and 1C, respectively.
Figure 3B:
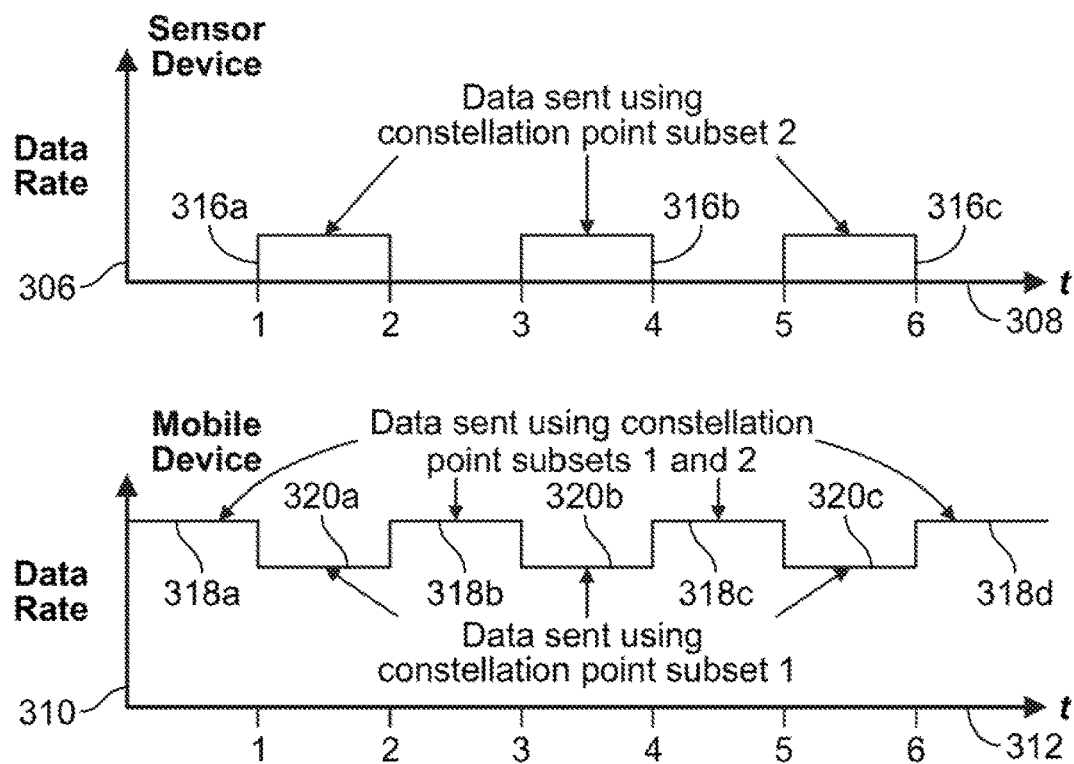

FIGS. 3A and 3B are diagrams illustrating example relative device data rates over time when allocating symbol constellation point subsets for signal transmissions. FIG. 3A shows data rate on axis 300 versus time (t) on axis 301 for a sensor device in the top plot, and data rate on axis 302 versus time (t) on axis 304 for a mobile device in the lower plot, where the sensor device and mobile device operate according to an implementation of system 100 of FIG. 1A. The sensor device of FIG. 3A may be a sensor device such as sensor device 118a, 118b, or 118c of FIG. 1A. The mobile device of FIG. 3A may be a mobile device such as mobile device 102 of FIG. 1A. In FIG. 3A, using sensor device 118a and mobile device 102 as examples, sensor device 118a may send collected sensor data to base station 108 during time period 303a between t1 and t2, during time period 303b between t3 an dt4, and during time period 303c between t5 and t6 using constellation point subset 1 of FIG. 1B. During the same time period, mobile device 102 may operate in the first MS mode and send continuous signal transmissions to base station 108 using constellation point subset 1 of FIG. 1B over the time period t1 to t6.

The signal transmissions from mobile device 102 and data transmissions from sensor device 118a may be carried on the same cellular frequency channel and may be overlapping in time. The time periods 303a, 303b, and 303e during which sensor device 118a sends sensor data to base station 108 may begin at predefined set times and last for predefined set durations as shown in FIG. 3A. In other implementations, the time periods 303a, 303b, and 303c may begin at random times and be of varying durations of length depending on how sensor device 118a is configured to send its sensor data to base station 108. In the scenario of FIG. 3A, mobile device 102 and sensor device 118a need not coordinate signal/data transmission or the timing of the use of constellation point subset 1 by mobile device 102, with one another. During the time periods 303a, 330b, and 303c base station 108 may operate in the second BS mode and separate the uplink signal transmissions 134 received from mobile device 102 from the sensor uplink signal transmissions 134. The data rate of transmissions from mobile device 102 does not change over time t1 to t6, although the overall data rate available to mobile device 102 over time t1 to t6 may be degraded due to the loss of the constellation points that are allocated to sensor device transmissions. Cellular demodulator 262a may demodulate uplink signal transmissions 134 received from mobile device 102 on a selected cellular frequency channel using the constellation points of subset 1, according to the modulation techniques used by mobile device 102, to demodulate and generate the data sent by mobile device 102. At the same time, sensor data demodulator 262b may demodulate sensor data transmissions 128a received from sensor device 118a on the selected cellular frequency channel using the constellation points of subset 2, according to the modulation techniques used by sensor device 118a to demodulate and generate the sensor data sent by sensor device 118a.

FIG. 3B shows data rate on axis 306 versus time (t) on axis 308 for a sensor device in the top plot, and data rate on axis 310 versus time (t) on axis 312 for a mobile device M the lower plot, where the sensor device and mobile device may operate according to another implementation of system 100 of FIG. 1A. The sensor device of FIG. 3B may be a sensor device such as sensor device 118a, 118b, or 118c of FIG. 1A. The mobile device of FIG. 3B may be a mobile device such as mobile device 102 of FIG. 1A. In FIG. 3B, using sensor device 118a and mobile device 102 as examples, during the time periods when sensor device 118a is using constellation point subset 2 of FIG. 1B to send sensor data, mobile device 102 operates in the second MS mode and uses only constellation point subset 1 of FIG. 1B to send signal transmissions. During the time periods when sensor device 118a is not using constellation point subset 2 to send uplink sensor data transmissions 128a, mobile device 102 of in a first MS mode and uses both constellation point subsets 1 and 2 to send uplink signal transmissions 134.

Sensor device 118a may send collected sensor data to base station 108 during, time period 316a between t1 and t2, during time period 316b between t3 and t4, and during time period 316c between t5 and to using constellation point subset 1 of FIG. 1B. Mobile device 102 may operate in first MS mode to send uplink signal transmissions 134 to base station 108 using both constellation point subsets 1 and 2 of FIG. 1B during the time period 318a between t0 to t1, during time period 318b between t2 and t3, during time period 318c between t4 and t5, and during time period 318d subsequent to t6. Also, mobile device 102 may operate in second MS mode to send signal transmissions to base station 108 using only constellation point subset 1 of FIG. 1B during the time period 320a between t1 to t2, during time period 320b between t3 and t4, and during time period 320c between t5 and t6. The data rate available to mobile device 102 for uplink signal transmissions 134 is reduced during time periods 320a, 320b, and 320 as compared to the data rate available to mobile device 102 during time periods 318a, 318b, 318c, and 318d, due to loss of the points of constellation point subset 2 to sensor device 118a during time periods 320a, 320b, and 320.

In one implementation of FIG. 3B, the time periods 316a, 316b, and 316c during which sensor device 118a sends, or may send, sensor data to base station 108 may begin at predefined set times and/or last for predefined set durations as shown in FIG. 3B. In this case, coordination/timing information may be managed by base station 108 in order that sensor device 118a and mobile device 102 know when to send data and transmissions using the appropriate constellation point subsets, and base station 108 knows the appropriate constellation point subsets to use to demodulate sensor data 128a and cellular signal transmissions 134 received at different times. In another implementation of FIG. 3B, sensor device 118a may send data at random time periods. In this case, the time periods 316a, 316b, and 316c may be determined at base station 108 by base station 108 monitoring the cellular frequency channel, while operating in the first BS mode, and while mobile device 102 transmits using both constellation point subsets 1 and 2. When base station 108 detects that sensor device 118a is sending uplink sensor data 128a on constellation point subset 2 and that sensor device transmissions are present on the frequency channel, base station 108 may initiate operation in the second BS mode and signal to mobile device 102 that mobile device 102 is to operate in the second MS mode. Base station 108 may then operate in the second BS mode and separate the uplink signal transmissions 134 received from mobile device 102 from the sensor data transmissions 128a received from sensor device 118a. Base station 108 may process signals received on the selected cellular frequency channel using QPSK and the constellation points of subset 2 to demodulate and generate the received sensor data sent by sensor device 118a. Base station 108 may also simultaneously process uplink signals transmissions 134 received from mobile device 102 on the appropriate cellular frequency channel using the constellation points of subset 1, according to the modulation techniques used by mobile device 102 to demodulate and generate the data sent by mobile device 102.

While FIGS. 3A and 3B have been described using sensor device 118a as the sensor device sending sensor data, in alternative implementations other sensor devices, such as sensor device 118b or sensor device 118c, may also be sending sensor data during time periods 303a, 330b, and 303c of FIG. 3A, and during, time periods 316a, 316b, and 316c, of FIG. 3B. This sensor data may be sent by the sensor devices 118b or 118c simultaneously, or on a time shared basis, with the sensor data sent by sensor device 118a as previously described in relation to FIG. 1A.

Figures 4A, 4B:
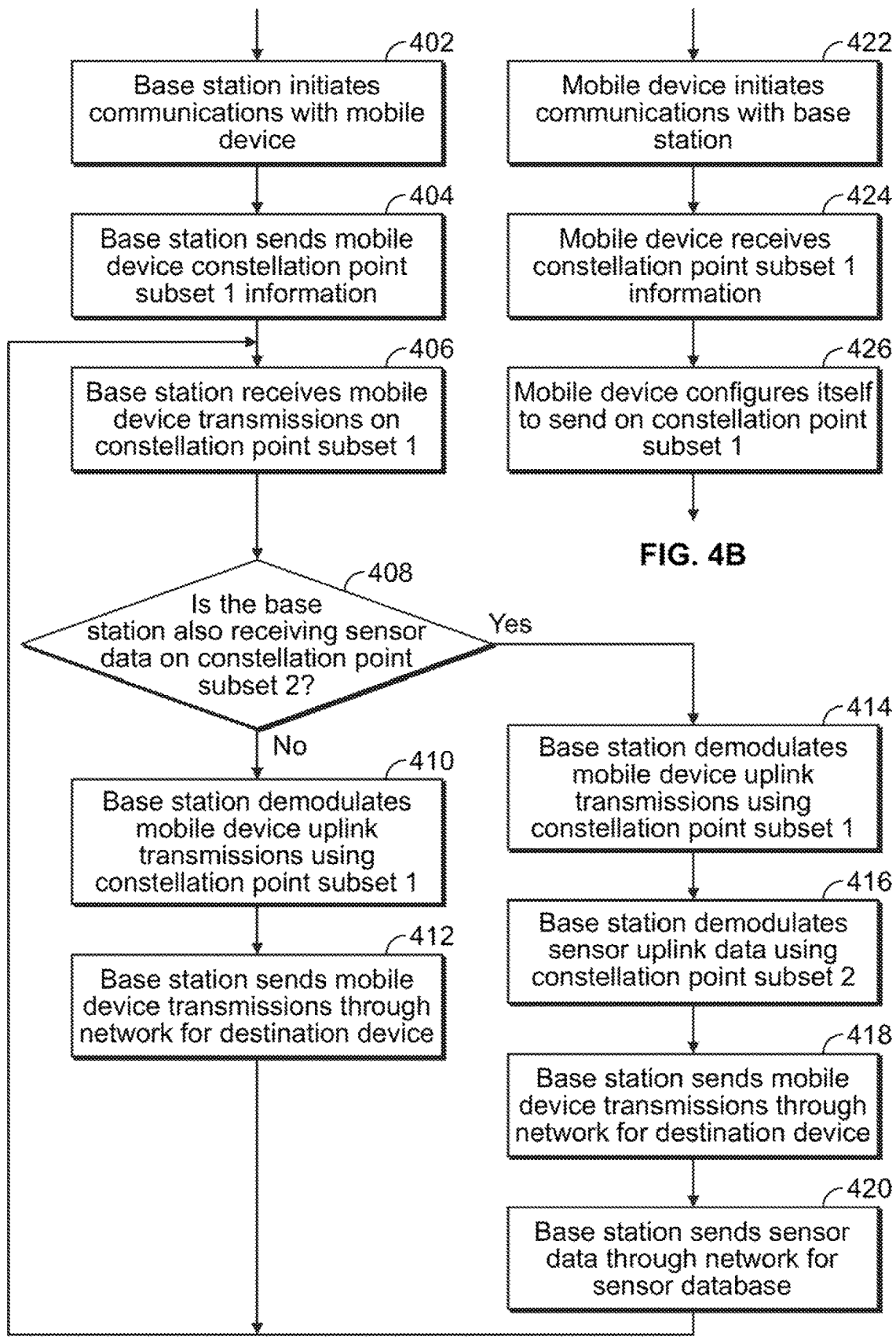
FIG. 4A is a flow diagram of operations performed by an example base station for receiving signals modulated in subsets of points of a symbol constellation.
FIG. 4B is a flow diagram of operations performed by an example mobile device for transmitting signals modulated in subsets of points of a symbol constellation.

FIG. 4A is a flow diagram of operations performed by an example base station for receiving signals encoded in subsets of points of a symbol constellation. In an implementation of FIG. 4A, the base station of FIG. 4A may represent base station 108 of FIG. 1A as it receives transmissions from mobile device 102 and sensor device 118a that are transmitting using the subsets of points of constellation 150 of FIG. 1C that comprise constellation point subsets 1 and 2, according to the timing of FIG. 3A.

The process begins at 402 where base station 108 initiates communications with mobile device 102. Base station 108 may set up an uplink cellular frequency channel for uplink signal transmissions 134 and a downlink cellular frequency channel on downlink 136 for receiver 262 and transmitter 252 to communicate with transmitter 282 and receiver 272, respectively, of mobile device 102. At 404, constellation point subset allocator 254 of base station 108 sends information to mobile device 102 about constellation point subset 1 using transmitter 252. The information about constellation point subset 1 is used to instruct mobile device 102 to send uplink signal transmissions 134 on the uplink cellular frequency channel using constellation point subset 1. The information about constellation point subset 1 may also include information instructing mobile device 102 to use constellation point subset 1 with a particular type of modulation. For example, the information may instruct mobile device 102 to transmit signals using 8 selected constellation points of subset 1 by encoding each 3-bit group of data for transmission onto one of the 8 selected constellation points, Ira another example, the information may control mobile device 102 to transmit signals using subset 1 by encoding each 3-bit group of data for transmission onto one of 8 constellation points of the 12 constellation points of subset 1, and using redundancy trellis code modulation to dynamically vary the 8 constellation points that are used out of the 12 constellation points.

At 406, base station 108 receives uplink signal transmissions 134 modulated on constellation point subset 1 over the uplink cellular frequency channel from mobile device 102. At 408, base station 108 determines whether it is also receiving uplink sensor data on constellation point subset 2 from sensor device 118a over the uplink cellular frequency channel. Transmitter 162 of base station 108 may monitor the uplink cellular frequency channel for sensor data transmissions 128a from sensor device 118a to determine if sensor device transmissions are present on the frequency channel.

If it is determined at 408 that base station 108 is not receiving sensor data, the process moves to 410. At 410, demodulator constellation controller 258 may control demodulator 262a of receiver 262 to demodulate the received signal transmissions using constellation point subset 1 and based on the appropriate modulation that is used at mobile device 102. Demodulator constellation controller 258 may receive the information about constellation point subset 1 (that was sent to mobile device 102) from constellation point subset allocator 254 in order to appropriately demodulate the received signal. Receiver 262 may provide the demodulated signal to cellular channel decoder 260, where the demodulated signal is channel decoded. At 412, the channel decoded signal may be sent to a destination device of the signal though network interface 250. The process then returns to 406 and repeats.

If it is determined at 408 that base station 108 is also receiving sensor data, the process moves to 414. At 414, demodulator constellation controller 158 may control demodulator 262a of receiver 262 to demodulate the signal transmissions received on the uplink cellular frequency channel using constellation point subset 1 and based on the appropriate modulation that is used at mobile device 102. Demodulator constellation controller 258 may receive the information about constellation point subset 1 (that was sent to mobile device 102) from constellation point subset allocator 254 in order to appropriately demodulate the received signal and generate the signal transmissions sent by mobile device 102. Receiver 262 may provide the demodulated signal to cellular channel decoder 260, where the demodulated signal is channel decoded.

Also, at 416, demodulator constellation controller 258 may control demodulator 262b of receiver 262 to demodulate the signal transmissions received on the uplink cellular frequency channel using constellation point subset 2 and based on the appropriate modulation that is used at sensor device 118a. Demodulator constellation controller 258 may receive the information about constellation point subset 2 from constellation point subset allocator 254 in order to appropriately demodulate the received signal and generate the sensor data sent by sensor device 118a. Receiver 262 may provide the demodulated sensor data to sensor data channel decoder 261, where the demodulated sensor data is channel decoded.

At 418, the channel decoded signal received from mobile device 102 may be sent to a destination device of the signal though network interface 250, and, at 420, the channel decoded sensor data received from sensor device 118a may be sent to sensor database 116 through network interface 250. The process then returns to 406 and repeats.

FIG. 4B is a flow diagram of operations performed by an example mobile device for transmitting signals encoded m subsets of points of a symbol constellation. In an implementation of FIG. 4B, the mobile device of FIG. 4B may represent mobile device 102 of FIG. 1A as it sends signal transmissions to base station 108 operating according to FIG. 4A.

The process of FIG. 4B begins at 422 where mobile device 102 initiates communications with base station 108. At 402, receiver 272 of mobile device 102 may receive a signal transmission on the cellular downlink frequency channel including information about constellation point subset 1 from base station 108.

At 404, the information about constellation point subset 1 may be extracted from the received signal transmission by constellation control signal extractor 274 and provided to modulator constellation controller 278. Modulator constellation controller 278 may then configure itself to control cellular modulator 282 of transmitter 282 to send uplink signal transmissions 134 on the uplink cellular frequency channel using constellation point subset 1. The information about constellation point subset 1 may also include information instructing mobile device 102 to use constellation point subset 1 with a particular type of modulation. For example, the information may be used by modulator constellation controller 278 to control cellular modulator 282a to modulate signals for transmission using 8 selected constellation points of subset 1 by encoding each 3-bit group of data for transmission onto one of the 8 selected constellation points. In another example, the information may control mobile device 102 to transmit signals using subset 1 by encoding each 3-bit group of data for transmission onto one of 8 constellation points of the 12 constellation points of subset 1, and using redundancy trellis code modulation to dynamically vary the 8 constellation points that are used out of the 12 constellation points.

Figure 5A:
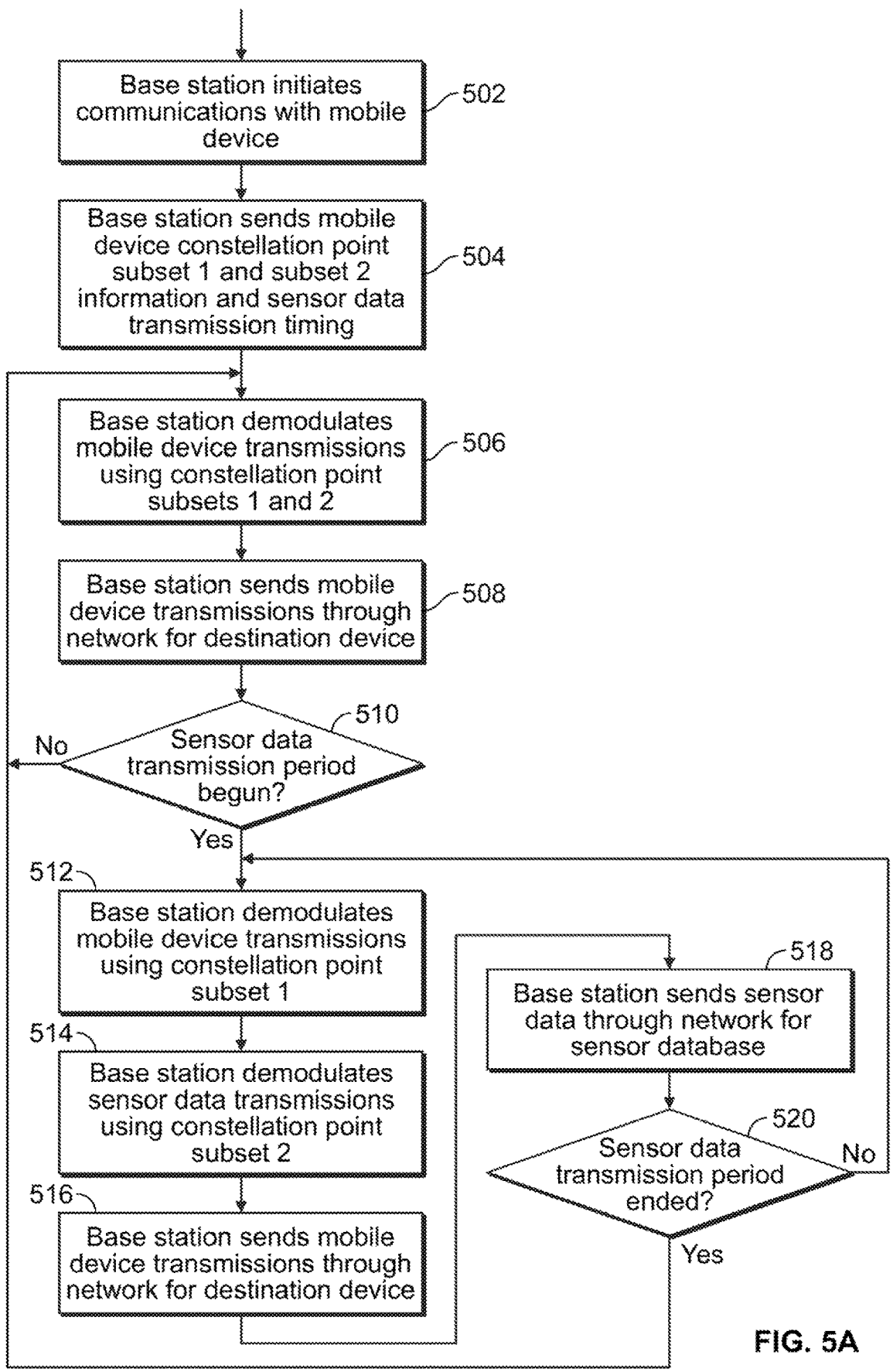
FIG. 5A is a flow diagram of operations performed by another example base station for receiving signals modulated in subsets of points of a symbol constellation.

FIG. 5A is a flow diagram of operations performed by another example base station for receiving signals encoded in subsets of points of a symbol constellation. In an implementation of FIG. 5A, the base station of FIG. 5A may represent base station 108 of FIG. 1A as it receives transmissions from mobile device 102 and sensor device 118a that are transmitting using the subsets of points of constellation 150 of FIG. 1C that comprise constellation point subsets 1 and 2 according to the timing of FIG. 3B.

The process begins at 502 where base station 108 initiates communications with mobile device 102. Base station 108 may set up an uplink cellular frequency channel for uplink signal transmissions 134 and a downlink cellular frequency channel on downlink 136 for receiver 262 and transmitter 252 to communicate with transmitter 282 and receiver 272, respectively, of mobile device 102. At 504, constellation point subset allocator 254 of base station 108 sends information to mobile device 102 associated with constellation point subset 1 and constellation point subset 2. The information about constellation point subset 1 is used to instruct mobile device 102 to send uplink signal transmissions 134 on the uplink cellular frequency channel using constellation point subset 1 and/or constellation point subset 2. The information about constellation point subsets 1 and 2 may also include timing information on when mobile device 102 may use only constellation point subset 1 to modulate signal transmission to base station 108, and timing information on when mobile device 102 may use both constellation point subset 1 and constellation point subset 2 to modulate uplink signal transmissions 134 to base station 108. The information about constellation point subsets 1 and 2 may additionally include information instructing mobile device 102 to, when using only constellation point subset 1, use constellation point subset 1 with a particular type of modulation. For example, the information ma control mobile device 102 to transmit signals using 8 selected constellation points of subset 1 by encoding each 3-bit group of data for transmission onto one of the 8 selected constellation points. In another example, the information may control mobile device 102 to transmit signals using subset 1 only by encoding each 3-bit group of data for transmission onto one of 8 constellation points of the 12 constellation points of subset 1, and using redundancy trellis code modulation to dynamically vary the 8 constellation points that are used out of the 12 constellation points. The information about constellation point subsets 1 and 2 may further include information instructing mobile device 102 to use 16-QAM when using the 16 constellation points of both constellation point subsets 1 and 2 to send transmissions to base station 108.

The timing information included in the information about constellation point subset 1 and constellation point subset 2 sent from base station 108 to mobile device 102 may define time periods during which mobile device, 102 may send signal transmissions to base station 108 that are modulated using both constellation point subset 1 and constellation point subset 2 and time periods when mobile device 102 may send signal transmissions to base station 108 that are modulated using only constellation point subset 1. For example, the timing information may include information defining time periods such as time periods 318*a*, 318*b*, 318*c*, and 318*d*, and, 320*a*, 320*b*, and 320*c*, of FIG. 3B.

At 506, base station 108 operates in first BS mode to demodulate uplink signal transmissions 134 that are received over the uplink cellular frequency channel from mobile device 102 and modulated on both constellation point subsets 1 and 2. Demodulator constellation controller 258 may control demodulator 262*a* of receiver 262 to demodulate the received signal transmissions using the combined constellation point subsets 1 and 2 and based on the appropriate modulation that is used at mobile device 102. For example, 16-QAM may be used at mobile device 102 to modulate the uplink signal transmissions 134 and 16-QAM may be used at base station 108 to demodulate the uplink signal transmissions 134. Demodulator constellation controller 25 may receive the information about constellation point subset 1 (that was sent to mobile device 102) from constellation point subset allocator 254 in order to appropriately demodulate the received signal. Receiver 262 may provide the demodulated signal to cellular channel decoder 260, where the demodulated signal is channel decoded. At 508, the channel decoded signal may be sent to a destination device of the signal though network interface 250.

At 510, base station 108 determines if a sensor data transmission period has begun, During the sensor data transmission period time sensor data may be present on the frequency channel. Demodulator constellation controller 258 may utilize information from timer 256 and the timing information about constellation point subsets 1 and 2 received from constellation point subset allocator 254 to perform the determination at 510. If it is determined at 510 that a sensor data transmission period has not begun, the process moves back to 506 and base station 10 continues to demodulate signal transmissions from mobile device 102 using both of constellation point subsets 1 and 2. If, however, it is determined at 510 that a sensor data transmission period has begun, the process moves to 512.

At 512, base station 108 begins operation in the second BS mode. Demodulator constellation controller 258 may control demodulator 262*a* of receiver 262 to demodulate the received signal transmissions from mobile device 102 using constellation point subset 1 based on the appropriate modulation that is used at mobile device 102 when only subset 1 is being used. Demodulator constellation controller 258 may receive the information about constellation point subset 1 (that was sent to mobile device 102) from constellation point subset allocator 254 in order to appropriately control cellular demodulator 262*a* to demodulate the received signal.

Also, at 514, demodulator constellation controller 258 may control sensor data demodulator 262*b* of receiver 262 to demodulate the sensor data uplink signal transmissions 218*a* received on the uplink cellular frequency channel using constellation point subset 2. Demodulator 262*b* may perform demodulation based on the appropriate modulation that is used at sensor device 1118*a*. Demodulator constellation controller 258 may receive the information about constellation point subset 2 from constellation point subset allocator 254 in order to appropriately demodulate the received signal and generate the sensor data sent by sensor device 118*a*. Receiver 262 may provide the demodulated sensor data to sensor data channel decoder 261, where the demodulated sensor data is channel decoded.

At 516, the channel decoded signal output by cellular channel decoder 260 may be sent to a destination device for the cellular data though network interface 250, and, at 518, the channel decoded signal output by sensor data channel decoder 261 is sent to sensor database 116 through network interface 250.

At 520, base station 108 determines if the sensor data transmission period has ended. Demodulator constellation controller 258 may utilize information from timer 256 and the timing information about constellation point subsets 1 and 2 received from constellation point subset allocator 254 to perform the determination at 520. If it is determined at 520 that the sensor data transmission period has not ended, the process returns to 512 and operations 512 to 520 are repeated. If, however, it is determined at 520 that the sensor data transmission period has ended, the process moves back to 506 where base station 108 switches back to the first BS mode and demodulates signal transmissions from mobile device 102 using the combined constellation point subsets 1 and 2. Operations 506, 508, and 510 may then be repeated until another sensor data transmission period begins and the process again moves to 512 where base station 108 switches to the second BS mode and performs operation 512 to 520.

Figure 5B:
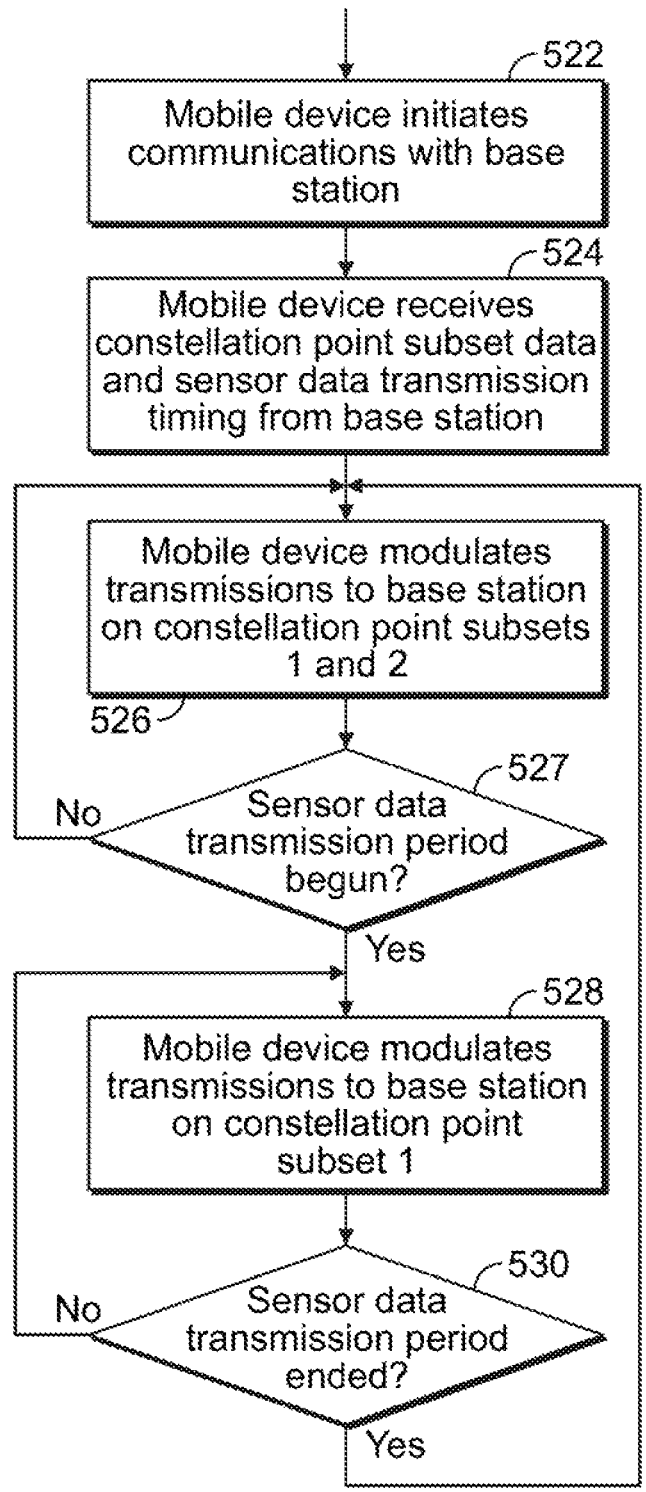
FIG. 5B is a flow diagram of operations performed by another example mobile device for transmitting signals modulated in subsets of points of a symbol constellation.

FIG. 5B is a flow diagram of operations performed by another example mobile device for transmitting signals encoded in subsets of points of a symbol constellation. In an implementation of FIG. 5B, the mobile device of FIG. 5B may represent mobile device 102 of FIG. 1A as it sends signal transmissions to base station 108 operating according to FIG. 5A.

The process of FIG. 5B begins at 522 where mobile device 102 initiates communications with base station 108. At 524, receiver 272 of mobile device 102 may receive a signal transmission on the cellular downlink frequency channel comprising information about constellation point subsets 1 and 2 from base station 108 that includes timing information. The information about constellation point subsets 1 and 2 may be extracted from the received signal transmission by constellation control signal extractor 274 and provided to modulator constellation controller 278. Modulator constellation controller 278 may then configure itself to control cellular modulator 282*a* of transmitter 282 to send uplink signal transmissions 134 on the uplink cellular frequency channel using constellation point subsets 1 and 2 of FIG. 1B. The information about constellation point subset 1 may also include information instructing mobile device 102 to use constellation point subset 1 with a particular type of modulation. For example, the information may be used by modulator constellation controller 178 to control cellular modulator 182*a* to modulate signals for transmission using 8 selected constellation points of subset 1 by encoding each 3-bit group of data for transmission onto one of the 8 selected constellation points. In another example, the information may instruct mobile device 102 to transmit signals using subset 1 by encoding each 3-bit group of data for transmission onto one of 8 constellation points of the 12 constellation points of subset 1, and using redundancy trellis code modulation to dynamically vary the 8 constellation points that are used out of the 12 constellation points. The timing information included in the information about constellation point subset 1 and constellation point subset 2 sent from base station 108 to mobile device 102 may define time periods during which mobile device 102 may send signal transmissions to base station 108 that are modulated using both constellation point subset 1 and constellation point subset 2, and time periods when mobile device 102 may send signal transmissions to base station 108 that are modulated using only constellation point subset 1. For example, the timing information may include information defining time periods such as time periods 318a, 318b, 318c, and 318d, and, 320a, 320b, and 320c, of FIG. 3B.

At 526, mobile device 102 operates in the first MS mode. Modulator constellation controller 278 controls modulator 282a to modulate signal transmissions using both constellation point subsets 1 and 2 and 16-QAM modulation. The modulated signal transmissions are sent from transmitter 282 to base station 108 on the cellular frequency channel. At 527, modulator constellation controller 278 determines if a sensor data transmission period has begun based on the timing information received from base station 108. If a sensor data transmission period has not begun, the process returns to 526 where mobile device 102 continues to send signal transmissions modulated on constellation point subsets 1 and 2 to base station 108. As operation 526 is performed, modulator constellation controller 278 continues to perform the determination at 527.

If it is determined, at 527, that a sensor data transmission period has begun, the process moves to 528. At 528, mobile device begins operation in the second MS mode. Modulator constellation controller 278 controls cellular modulator 282a so that cellular modulator 182a modulates signal transmissions sent from transmitter 182 on the cellular frequency channel using constellation point subset 1 and modulation according to the information about constellation point subset 1 received from base station 108. At 530, modulator constellation controller 278 determines if the sensor data transmission period has ended. If it is determined, at 530, that the sensor data transmission period has not ended, the process moves to 528. Transmitter 182 then continues to send signal transmissions modulated using constellation point subset 1. As operation 528 is performed, modulator constellation controller 278 continues to perform the determination at 530.

If it is determined, at 530, that the sensor data transmission period has ended, the process moves back to 526. Operations 526, 527, 528, and 530 are repeated as transmitter 182 is controlled by modulation constellation controller 278 to switch back and forth between using the combined constellation point subsets 1 and 2, and the constellation point subset 1 to modulate signal transmissions on the cellular frequency channel based on the determinations made at 527 and 530.

Figure 6A:
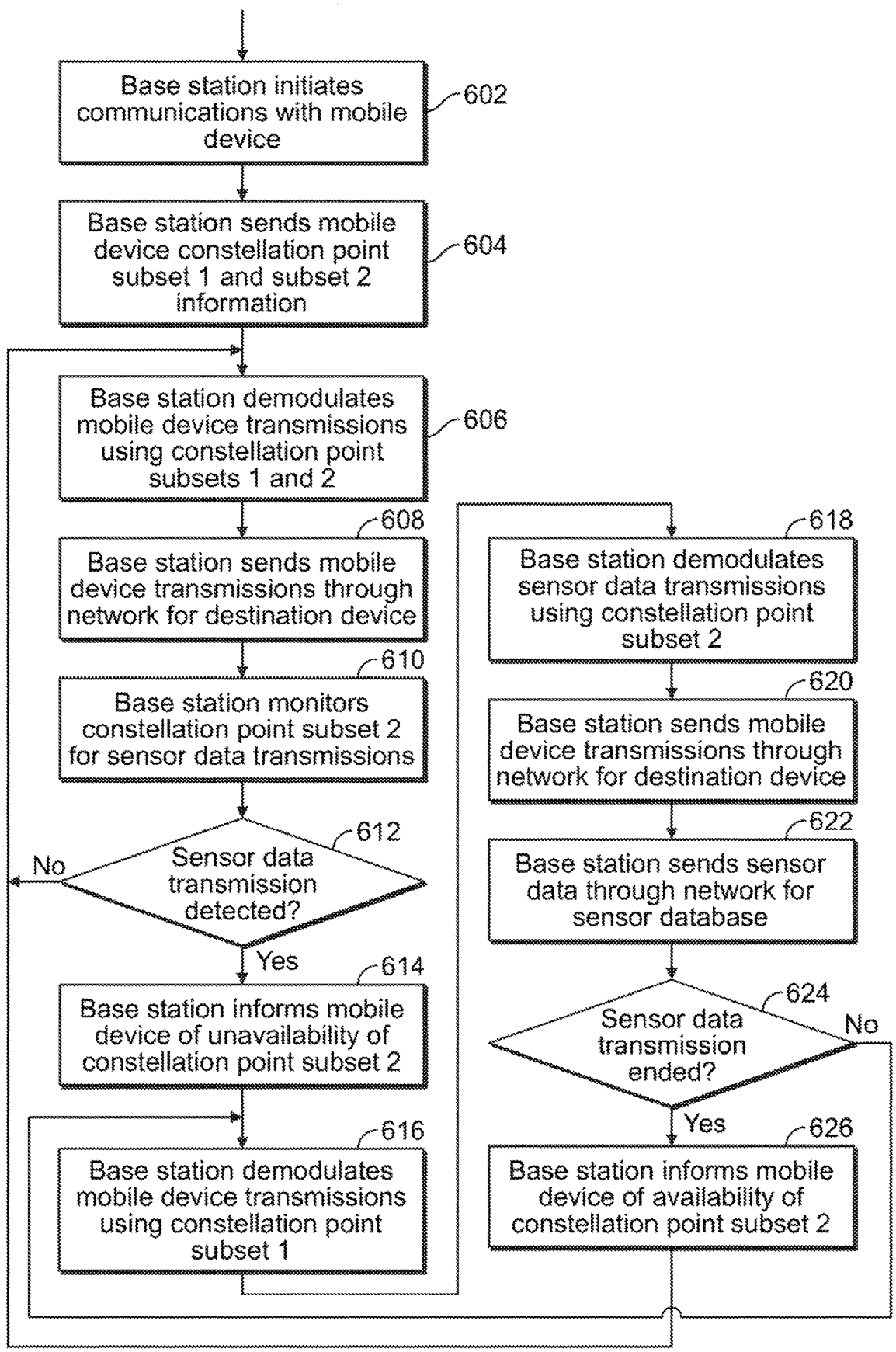
FIG. 6A is a flow diagram of operations performed by further example base station for receiving signals modulated in subsets of points of a symbol constellation.

FIG. 6A is a lion diagram of operations performed by a further example base station for receiving signals encoded in subsets of points of a symbol constellation. In an implementation of FIG. 6A, the base station of FIG. 6A may represent base station 108 of FIG. 1A as it receives transmissions from mobile device 102 and sensor device 118a that are transmitting using the subsets of points of constellation 150 of FIG. 1C that comprise constellation point subsets 1 and 2 according to the timing of FIG. 3B.

The process of FIG. 6A is performed similarly to the process of FIG. 5A. The difference between the implementation of FIG. 5A and the implementation of FIG. 6A is that the operations at 510 in the process of FIG. 5A may be replaced with the operations at 610, 612, and 614 in the process of FIG. 6A, and the operations at 520 in the process of FIG. 5A may be replaced with the operations at 624 and 626 in the process of FIG. 6A. In FIG. 6A base station 108 switches between the first BS mode, is which base station 108 demodulates uplink signal transmissions 134 that are received over the uplink cellular frequency channel from mobile device 102 using combined constellation point subsets 1 and 2, and the second BS mode, in which base station 108 demodulates uplink signal transmissions 134 that are received over the uplink cellular frequency channel from mobile device 102 using constellation point subset 1, based on whether or not sensor data transmissions from sensor device 118a are being detected at base station 108. The implementation of FIG. 6A allows sensor devices 118a, 118b, and 118c to be installed in network 100 to send sensor data to network 100 randomly to base station 108, without configuring sensor devices 118a, 118b, and 118, mobile device 102, and base station 108 to control modulation/demodulation on constellation point subsets 1 and 2, and transmission/reception according, to predetermined timing as is done in the implementation of FIG. 5A.

The process of FIG. 6A begins when operations 602, 604, 606, and 608 are performed in the same manner as operations 503, 504, 506, and 508, respectively, of FIG. 5A are performed. At 610, base station 108 monitors constellation point subset 2 for sensor data transmissions while base station 108 receives signal transmissions modulated on constellation point subsets 1 and 2 from mobile device 102. Demodulation constellation controller 258 may control sensor data demodulator 262b of receiver 262 to monitor for received sensor data transmissions. At 612, demodulator constellation controller 158 determines if sensor data transmissions have been detected. If sensor data transmissions have not been detected, the process moves back to 606 and operations 606, 608, 610, and 612 are repeated.

If sensor device transmissions are present on the frequency channel and sensor transmissions are detected at 612, the process moves to 614. At 614, demodulator constellation controller 258 may provide an indication to constellation point subset allocator 254 that sensor data transmissions have been detected. Constellation point subset allocator 254 may then control transmitter 252 to send on indication on the cellular downlink frequency channel to inform mobile device 102 to switch to the second MS mode and modulate signal transmissions to base station 108 using only constellation point subset 1. The process moves to 616 and operations 616, 618, 620, and 622, are performed in the same manner as operations 512, 514, 516 and 518 of FIG. 5A. At 624, while performing operations 616, 618, 620, and 622, demodulator constellation controller 258 monitors receiver 162 to determine if the sensor data transmissions have ended. If it is determined that sensor data transmissions have not ended, the process moves back to 616 and operations 616, 618, 620, and 622 are repeated. If it is determined, at 624, that sensor data transmissions have ended, the process moves back to 606. Operations 606, 608, 610, and 612 are then performed with base station 108 operating in the first BS mode using the combined constellation point subsets 1 and 2 for demodulating signal transmissions from mobile device 102. Operations 606, 608, 610 and 612 may then be repeated until another sensor data transmission is detected at 612 and the process again moves to 614 where base station 108 informs mobile device 102 to switch to second MS mode, switches itself to second BS mode, and performs operation 616 to 626.

Figure 6B:
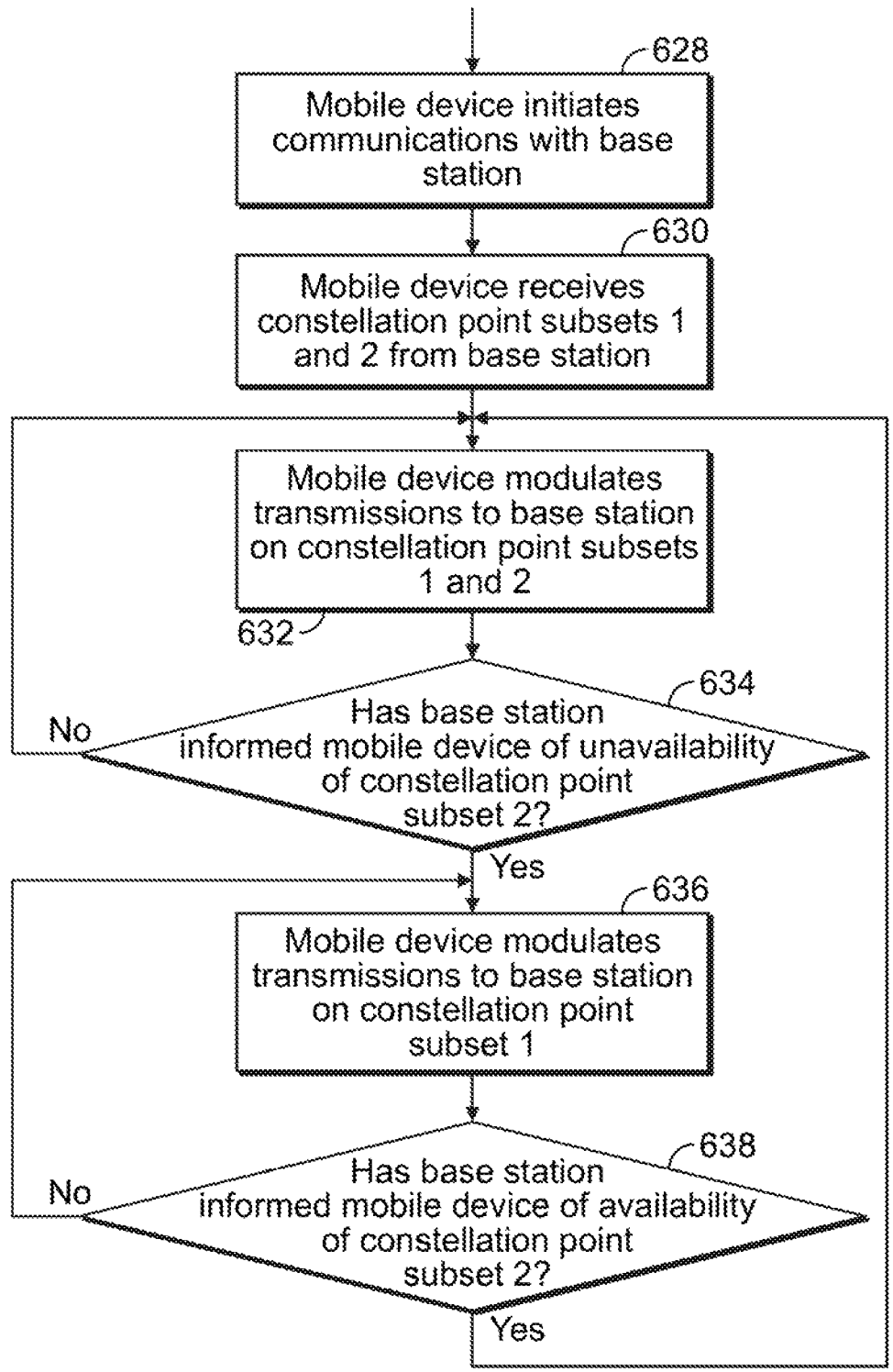
FIG. 6B is a flow diagram of operations performed by a further example mobile device for transmitting signals modulated in subsets of points of a symbol constellation.

FIG. 6B is a flow diagram of operations performed by a further example mobile device for transmitting signals encoded in subsets of points of a symbol constellation. In an implementation of FIG. 6B, the mobile device of FIG. 6B may represent mobile device 102 of FIG. 1A as it sends signal transmissions to base station 108 operating according to FIG. 6A. The process of FIG. 6B may be performed in a similar manner to the process of FIG. 5B, except that the operation at 634 of FIG. 6A replaces the operation at 527 of FIG. 5A, and the operation at 638 of FIG. 6A replaces the operation at 530 of FIG. 5A.

In the implementation of FIG. 6B, as compared to the implementation of FIG. 5A, rather than switching between the first and second MS modes based on predetermined timing, mobile device 102 switches back and forth between the first MS mode and the second MS mode at operations 634 and 638 based on indications/control information received from base station 108 as base station 108 monitors for sensor data transmissions at operations 612 and 624 of FIG. 6A.

It should be noted that while the implementations of FIGS. 4A, 4B, 5A, 5B, 6A, and 6B have been described by using sensor device 118a as a specific example of the transmitting sensor device, the implementations are meant to operate to receive and process sensor data from multiple sensor devices that may transmit sensor data at the same time, or substantially at the same time to a receiving device. For example, the sensor data received and demodulated at base station 108 may include separate sensor data sent from each of sensor 118a, 118b, and 118c simultaneously, or overlapping in time, during the appropriate time periods when a constellation point subset is allocated to sensor devices for transmitting sensor data.

FIGS. 7A and 7B are diagrams illustrating further example symbol constellation point subset allocations that may be used in an implementation of constellation subgroup hopping. FIGS. 7A and 7B show a configuration of symbol constellation 150 for use in another implementation of network 100 of FIG. 1A. As described in relation to FIG. 1C, constellation 150 may be divided into subsets 1 and 2. FIGS. 7A and 7B shows how constellation point subset 2 may be further divided into a subgroup 702 (FIG. 7A) comprising points 6 and 7, and a subgroup 704 (FIG. 7B) comprising points 10 and 11.

Subgroups 702 and 704 of FIGS. 7A and 7B may be used in an implementation of a sensor device 118a that provides constellation subgroup hopping to allow sensor data to be sent from the sensor device 118a by alternately using, or hopping between, subgroups of points of a constellation. In the implementation of FIGS. 7A and 7B, the subgroups of points of the constellation comprise the 2-point subgroups 702 and 704 of the constellation point subset 2 that are allocated for sensor data transmission 128a to base station 108. In this case, sensor device 118a may use binary phase shift keying (BPSK) to modulate sensor data onto the 2-point subgroups in an alternate manner. The alternate use of the different subgroups 702 and 704 for transmission by sensor device 118a and other sensor devices in network 100 may reduce interference. For example, when multiple sensor devices, such as 118a, 118b, and 118c are implemented in network 100 each sensor device may alternate transmissions between subgroups 702 and 704 in a random or in a synchronized manner. For example, sensor device 118a may use subgroup 702 with BPSK for sending sensor data in a first transmission period, and then use subgroup 704 with BPSK for sending sensor data in a second transmission period that follows the first transmission period. At the same time, sensor device 118b may use subgroup 704 with BPSK for sending sensor data in the first transmission period, and then use subgroup 702 with BPSK for sending sensor data in the second transmission period that follows the first transmission period. When implemented in multiple sensor devices this technique may reduce interference and/or collisions between sensor data transmissions sent to a base station by each of the sensor devices. The use of subgroup hopping may be used in any of the disclosed implementations when sensor device 118a sends uplink sensor data 128a.

FIG. 8 is a flow diagram of example operations performed by a sensor device for transmitting signals encoded in subgroups of allocated subsets of points of a symbol constellation. In an implementation of FIG. 8, the sensor device of FIG. 8 may represent sensor device 118a of FIG. 1A and sensor device 218a of FIG. 2C as it sends sensor data to base station 108, FIG. 8 may be explained by reference to FIG. 2C.

The process begins at 802 where transmitter 205 of sensor device 218a is configured to use constellation point subset 1 using subgroup transmission hopping. As part of the configuration an index F is set to 0. At 804, modulator constellation controller 207 determines if sensor data transmission period has begun. The sensor data transmission periods may be at random times and of random durations, or be at predetermined times and of predetermined durations, depending on the implementation of network 100 in which device 218a is implemented. If no sensor data transmission period has begun, the process returns to 804 and continues to repeat the determination at 804. If a sensor data transmission period has begun, the process moves to 806. At 806, modulator constellation controller 207 determines if F=0. If F=0, the process moves to 808 where sensor device 218a sends sensor data using a subgroup of the constellation point subgroup 702 and sets F=1. The process of FIG. 8 then returns to 804. As operations 804, 806, and 808 (or alternately 810) are performed and the index F is alternately set to 1 or 0, sensor data transmissions sent from sensor device 118a are alternately sent on subgroup 702 and on subgroup 704. This provides constellation point subgroup transmission hopping for sending sensor data from sensor device 118a.

Figure 9:
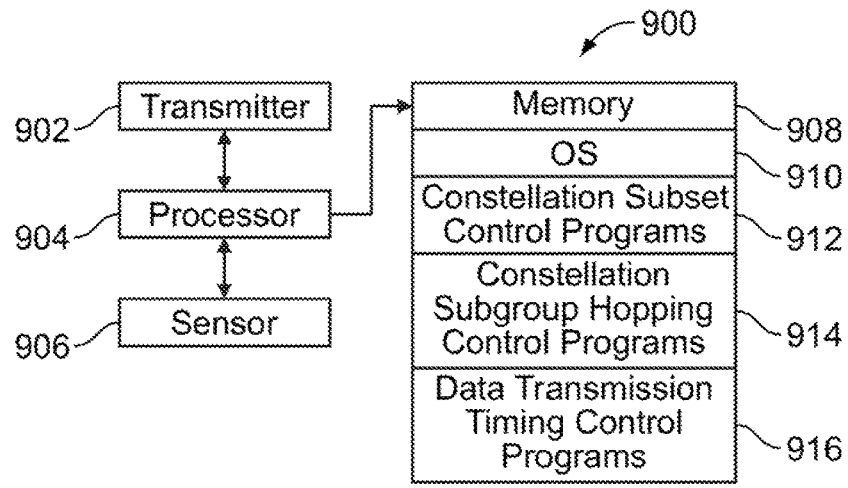
FIG. 9 is a simplified block diagram showing an example data sensor device.

FIG. 9 is a simplified block diagram showing an example data sensor device. Sensor device 900 represents a possible implementation of sensor device 118a of FIG. 1A and sensor device 218a of FIG. 2C. Sensor device 900 includes processor 904, memory 908, transmitter 902, and sensor 906. Memory 908 includes code and instructions for constellation subset control programs 912, constellation subgroup hopping control programs 914 and data transmission timing control programs 916. Memory 908 may also include a device operating system (OS) 910. Processor 904 may comprise one or more processors, or other control circuitry or any combination of processors and control circuitry that provide overall control of sensor device 900 according to the disclosed embodiments. Memory 908 may be implemented as any type of computer readable storage media, including non-volatile and volatile memory.

Execution of constellation subset control programs 912 may cause processor 904 to implement functions and perform operations that cause sensor device to modulate sensor data transmissions sent to base station 108 using subsets of constellation points of a symbol constellation according to the implementations of the sensor devices disclosed in any of FIGS. 1A, 2C, 3A-3B, 7A-7B, and 8. In one implementation of sensor device 900, execution of data transmission timing control programs 916 may cause processor 904 to control sensor device 900 to time it sensor data transmissions according to timing information used by receiving base stations and transmitting mobile devices for using subsets of a symbol constellation in a network. The timing information ma be programmed into data transmission timing control programs 916 upon installation of sensor device 900 in a network, or may be programmed over an air interface. In another implementation of sensor device 900, sensor device 900 may transmit uplink sensor data at random times, as needed, to a base station, without utilizing data transmission timing control programs 916. Constellation subgroup hopping control programs 914 may be configured in memory 908 when it is desired that sensor device 900 operate according to the constellation subgroup hopping described in relation to FIGS. 7A, 7B, and 8.

Figure 10:
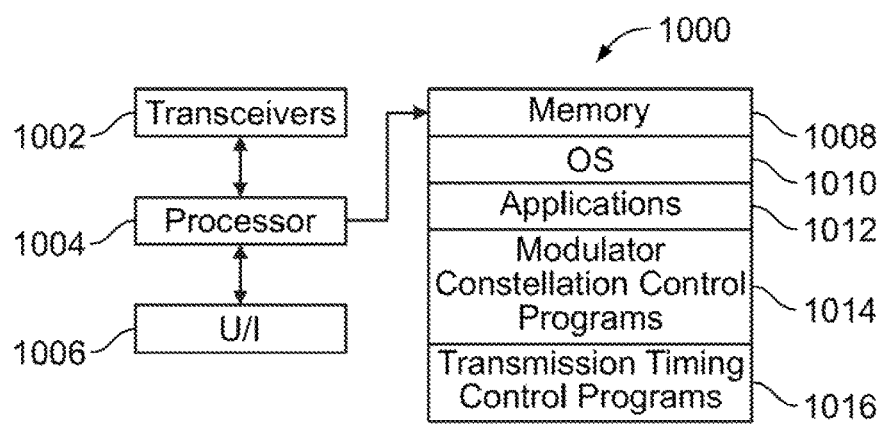
FIG. 10 is a simplified block diagram showing an example mobile device.

FIG. 10 is a simplified block diagram shoe ling an example mobile device. Mobile device 1000 represents a possible implementation of mobile device 102 of FIG. 1A and mobile device 202 of FIG. 2B. Mobile device 1000 includes processor 1004, memory 1008, transceivers 1002, and user interface (UI) 1006. Memory 1008 includes code and instructions for modulator constellation control programs 1014 and transmission timing control programs 1016. Memory 1008 may also include device operating system (OS) 1010 and applications 1012. Processor 1004 may comprise one or more processors, or other control circuitry or any combination of processors and control circuitry that provide overall control of mobile device 1000 according to the disclosed embodiments. Memory 1008 may be implemented as any type of computer readable storage media, including non-volatile and volatile memory.

In the embodiments, execution of modulator constellation control programs 1014 may cause processor 1104 to implement functions and perform operations that cause mobile device 1000 to modulate signal transmission sent to base station 108 using either of a first allocation of points/subsets of a symbol constellation, or a second allocation of points/subsets of the symbol constellation, according to the implementations of the mobile devices disclosed in any of FIGS. 1A, 2B, 3A-3B, 4B, 5B, and 6B. Execution of modulator constellation control programs 1014 may also cause processor 1004 to receive information sent from a base station to cause mobile device 1000 to self-configure to modulate the signal transmissions sent to base station 1100 using corresponding first and second allocations of points/subsets of the symbol constellation according to the received information. Execution of transmission timing control programs 1016 causes processor 1004 to control mobile device 1000 to switch back and forth between using a first allocation of constellation points/subsets of points and using a second allocation of constellation points/subsets of points, in synchronization with a receiving base station to correctly modulate signals sent to the base station.

Figure 11:
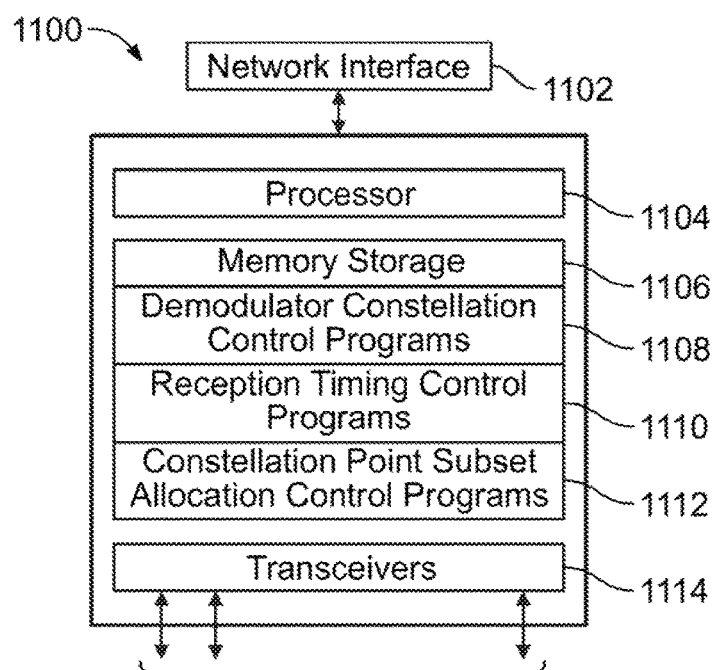
FIG. 11 is a simplified block diagram showing an example base station.

FIG. 11 is a simplified block diagram showing an example base station. Base station 1100 represents a possible implementation of base station 108 of FIG. 1A and base station 208 of FIG. 2A. Base station 1100 includes processor 1104, memory/storage 1106, transceivers 1114, and network interface 1102. Memory/storage 1106 includes code and instructions for demodulator constellation control programs 1108, reception timing control programs 1110, and constellation point subset allocation control programs 1112. Processor 1104 may comprise one or more processors, or other control circuitry or any combination of processors and control circuitry that provide overall control of base station 1100 according to the disclosed embodiments. Memory/storage 1106 may be implemented as any type of computer readable storage media, including non-volatile and volatile memory.

In the embodiments, execution of constellation point subset allocation programs 1112 may cause processor 1104 to implement functions and perform operations that cause base station 1100 to configure itself to demodulate signal transmission horn mobile devices and sensor devices using either of a first allocation of points/subsets of a symbol constellation, or a second allocation of points/subsets of the symbol constellation, according to the implementations of base stations disclosed in any of FIGS. 1A, 2A, 3A-3B, 4A, 5A, and 6A. Execution of constellation point subset allocation programs 1112 may also cause processor 1104 to send information to mobile devices communicating with base station 1100 to cause the mobile devices to configure themselves to modulate signal transmission sent to base station 1100 from the mobile devices using corresponding first and second allocations of points/subsets of the symbol constellation. Execution of demodulator constellation control programs 1108 causes processor 1104 to control base station 1100 to demodulate and separate received signal transmissions from mobile devices and sensor data sent from sensor devices using the first allocation of constellation points/subsets of points or using the second allocation of constellation points/subsets of points. Execution of reception timing control programs 1110 causes processor 1104 to control base station 1100 to switch back and forth between using the first allocation of constellation points/subsets of points and using the second allocation of constellation points/subsets of points, in synchronization with the transmitting mobile devices, to correctly demodulate received signals from the mobile devices and sensor data transmissions from sensor devices.

The example embodiments disclosed herein may be described in the general context of processor-executable code or instructions stored on memory that may comprise one or more computer readable storage media (e.g., tangible non-transitory computer-readable storage media such as memory 908, 1008, and 1108). As should be readily understood, the terms "computer-readable storage media" or "non-transitory computer-readable media" include the media for storing of data, code and program instructions, such as memory 908, 1008, and 1108, and do not include portions of the media for storing transitory propagated or modulated data communication signals.

While the functionality disclosed herein has been described by illustrative example using descriptions of the various components and devices of embodiments by referring to functional blocks and processors or processing units, controllers, and memory including instructions and code, the functions and processes of the embodiments may be implemented and performed using any type of processor, circuit, circuitry or combinations of processors and/or circuitry and code. This may include, at least in part, one or more hardware logic components. For example, and without limitation, illustrative types of hardware logic components that ran be used include field programmable gate arrays (FPGAs), application specific integrated circuits (ASICs), application specific standard products (ASSPs), system-on-a-chip systems (SOCs), complex programmable logic devices (CPLDs), etc. Use of the term processor or processing unit in this disclosure is mean to include all such implementations. Also, while particular types of networks and devices have been used in this disclosure to illustrate example implementations, the techniques disclosed herein may utilized by any type of transmitting device or devices sending data to any type of receiving device.

The disclosed implementations include an apparatus comprising a receiver, one or more processors in communication with the receiver, and memory in communication with the one or more processors, the memory comprising code that, when executed, causes the one or more processors to control the apparatus to receive a first signal from a first device on a frequency channel, receive a second signal from a second device on the frequency channel, demodulate the first signal using a first subset of points of a constellation to generate a first set of data, and, demodulate the second signal using a second subset of points of the constellation to generate a second set of data. The code may be executable to cause the one or more processors to further control the apparatus to receive a third signal from the first device on the frequency channel, and demodulate the third signal using the first and the second subset of points of the constellation to generate a third set of data. The code may be executable to cause the one or more processors to further control the apparatus to send information associated with at least the first subset of points of the constellation to the first device. The code may be executable to cause the one or more processors to further control the apparatus to demodulate the first signal to generate the first set of data using redundancy trellis code demodulation. The code may be executable to cause the one or more processors to control the apparatus to demodulate the second signal to generate the second set of data in response to detecting that the second signal is present on the frequency channel. The code may be executable to cause the one or more processors to control the apparatus to demodulate the first signal to generate the first set of data and demodulate the second signal to generate the second set of data in response to detecting that the second signal is present on the frequency channel. The code may be executable to cause the one or more processors to control the apparatus to demodulate the second signal to generate the second set of data in response to determining that a time period for the second signal to be present on the frequency channel has begun. The code may be executable to cause the one or more processors to control the apparatus to demodulate the first signal to generate the first set of data and the second signal to generate the second set of data in response to determining that a time period for the second signal to be present on the frequency channel has begun. The first subset of points may be larger than the second subset of points. The code may be executable to cause the one or more processors to further control the apparatus to forward the first set of data onward though a network to a first destination device, and forward the second set of data onward though the network to a second destination device. The code may be executable to cause the one or more processors to demodulate the first signal by controlling the apparatus to process the second signal as interference, and demodulate the first signal using the first subset of points to generate the first set of data. The code may be executable to cause the one or more processors to demodulate the second signal by controlling the apparatus to process the first signal as interference to determine an interference signal, and demodulate the second signal using the first subset of points and subtracting the interference signal, to generate a first set of data.

The disclosed implementations further include a first device comprising a transmitter, one or more processors in communication with the transmitter, and memory in communication with the one or more processors, the as comprising code that, when executed, causes the one or more processors to control the first device to determine a first subset of points of a constellation, modulate a data stream using the first subset of points of the constellation to generate a first signal, transmit the first signal to a second device on a frequency channel, determine that a second subset of points of the constellation is available for use, modulate the data stream using the first and the second subset of points of the constellation to generate a second signal, and transmit the second signal to the second device on the frequency channel. The code may be executable to cause the one or more processors to control the first device to modulate the data stream using the first subset of points to generate the first signal by using redundancy trellis code modulation. The code may executable to cause the one or more processors to control the first device to modulate the data stream using the first subset of points to generate the first signal by using phase shift keying. The first device may determine that the second subset of points of the constellation is available by determining that a time period has ended. The first device may determine that the second subset of points of the constellation is available by determining that an indication of availability has been received from the second device. The first subset of points is larger than the second subset of points.

The disclosed implementations also include a first device comprising a transmitter, one or more processors in communication with the transmitter, and memory in communication with the one or more processors, the memory comprising code that, when executed, causes the one or more processors to control the first device to modulate first data using a first subgroup of points of a constellation, transmit the modulated first data to a second device, modulate second data using a second subgroup of points of the constellation, transmit the modulated second data to the second device, and, wherein transmissions to the second device are alternately modulated using the first and second subgroups of points of the constellation. The first device may comprise an Internet of Things sensor device.

Although the subject matter has been described in language specific to structural features and/or methodological acts, it is to be understood that the subject matter defined in the appended claims is not necessarily limited to the specific features or acts described above. Rather, the specific features and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the processes, these elements, and operations may be combined with or, be replaced by, any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:
1. An apparatus comprising:
a processor; and
a memory in communication with the processor, the memory comprising executable instructions that, when executed by the processor, cause the processor to control the apparatus to perform functions of:
sending, to a first device, information associated with a first subset of points of a constellation on a frequency channel;
receiving a first signal from the first device on the frequency channel;
receiving a second signal from a second device on the frequency channel, the second signals being received as a separate signal from the first signal;
demodulating the received first signal using the first subset of points of the constellation to generate a first set of data; and
demodulating the received second signal using a second subset of points of the constellation to generate a second set of data.

2. The apparatus of claim 1, wherein the instructions, when executed by the processor, further cause the processor to control the apparatus to perform functions of:
receiving a third signal from the first device on the frequency channel; and
demodulating the third signal using the first and the second subset of points of the constellation to generate a third set of data.

3. The apparatus of claim 1, wherein the instructions, when executed by the processor, further cause the processor to control the apparatus to perform a function of demodulating the first signal to generate the first set of data using redundancy trellis code demodulation.

4. The apparatus of claim 1, wherein the instructions, when executed by the processor, further cause the processor to control the apparatus to perform a function of demodulating the second signal to generate the second set of data in response to detecting that the second signal is present on the frequency channel.

5. The apparatus of claim 1, wherein the instructions, when executed by the processor, further cause the processor to control the apparatus to perform a function of demodulating the first signal to generate the first set of data and demodulate the second signal to generate the second set of data in response to detecting that the second signal is present on the frequency channel.

6. The apparatus of claim 1, wherein the instructions, when executed by the processor, further cause the processor to control the apparatus to perform a function of demodulating the second signal to generate the second set of data in response to determining that a time period for the second signal to be present on the frequency channel has begun.

7. The apparatus of claim 1, wherein the instructions, when executed by the processor, further cause the processor to control the apparatus to perform a function of demodulating the first signal to generate the first set of data and the second signal to generate the second set of data in response to determining that a time period for the second signal to be present on the frequency channel has begun.

8. The apparatus of claim 1, wherein the first subset of points is larger than the second subset of points.

9. The apparatus of claim 1, wherein the instructions, when executed by the processor, further cause the processor to control the apparatus to perform functions of:
forwarding the first set of data onward through a network to a first destination device; and
forwarding the second set of data onward through the network to a second destination device.

10. The apparatus of claim 1, wherein, to demodulate the first signal, the instructions, when executed by the processor, cause the processor to control the apparatus to perform functions of:
processing the second signal as interference; and
demodulating the first signal using the first subset of points to generate the first set of data.

11. The apparatus of claim 1, wherein, to demodulate the second signal, the instructions, when executed by the processor, cause the processor to control the apparatus to perform functions of:
processing the first signal as interference to determine an interference signal; and
demodulating the second signal using the second subset of points and subtracting the interference signal, to generate the second set of data.

12. A method of operating an apparatus for demodulating a plurality of signals using a plurality of constellation point subsets, comprising:
sending, to a first device, information associated with a first subset of points of a constellation on a frequency channel;
receiving a first signal from the first device on the frequency channel;
receiving a second signal from a second device on the frequency channel, the second signal being received as a separate signal from the first signal;
demodulating the received first signal using the first subset of points of the constellation to generate a first set of data; and
demodulating the received second signal using a second subset of points of the constellation to generate a second set of data.

13. The method of claim 12, further comprising:
receiving a third signal from the first device on the frequency channel; and
demodulating the third signal using the first and the second subset of points of the constellation to generate a third set of data.

14. The method of claim 12, further comprising detecting whether the second signal is present on the frequency channel, wherein the second signal is demodulated to generate the second set of data when it is determined that the second signal is present on the frequency channel.

15. The method of claim 12, wherein the first subset of points is larger than the second subset of points.

16. The method of claim 12, further comprising:
forwarding the first set of data onward through a network to a first destination device; and
forwarding the second set of data onward through the network to a second destination device.

17. The method of claim 12, wherein demodulating the first signal comprises:
processing the second signal as interference; and
demodulating the first signal using the first subset of points to generate the first set of data.

18. The method of claim 12, wherein demodulating the second signal comprises:
processing the first signal as interference to determine an interference signal; and
demodulating the second signal using the second subset of points and subtracting the interference signal, to generate the second set of data.

19. A non-transitory computer readable medium containing instructions for causing a computer to perform functions of:

sending, to a first device, information associated with a first subset of points of a constellation on a frequency channel;
receiving a first signal from the first device on the frequency channel;
receiving a second signal from a second device on the frequency channel, the second signal being received as a separate signal from the first signal;
demodulating the received first signal using the first subset of points of the constellation to generate a first set of data; and
demodulating the received second signal using a second subset of points of the constellation to generate a second set of data.

20. The non-transitory computer readable medium of claim 19, wherein, for demodulating the received second signal, the instructions further cause the computer to perform a function of detecting whether the second signal is present on the frequency channel.

* * * * *